US011124247B2

(12) United States Patent
Sosnowich et al.

(10) Patent No.: US 11,124,247 B2
(45) Date of Patent: Sep. 21, 2021

(54) MODULAR LIGHT WEIGHT UNIVERSAL NON-INVASIVE RETRACTABLE STORAGE SYSTEM FOR A TRUCK BED, VAN AND/OR A TRAILER BED

(71) Applicant: Sosco Ltd, Barrie (CA)

(72) Inventors: Lance Ernie Sosnowich, Barrie (CA); Alan Victor Doner, Peterborough (CA); Larry Milan Nash, Peterborough (CA)

(73) Assignee: Sosco Ltd., Ontario (CA)

( * ) Notice: Subject to any disclaimer, the term of this patent is extended or adjusted under 35 U.S.C. 154(b) by 0 days.

(21) Appl. No.: 16/910,587

(22) Filed: Jun. 24, 2020

(65) Prior Publication Data

US 2020/0406986 A1    Dec. 31, 2020

Related U.S. Application Data

(60) Provisional application No. 62/866,955, filed on Jun. 26, 2019.

(51) Int. Cl.
*B62D 33/02* (2006.01)
*B60R 9/06* (2006.01)

(52) U.S. Cl.
CPC ............ *B62D 33/0207* (2013.01); *B60R 9/06* (2013.01)

(58) Field of Classification Search
CPC .......... B60R 11/06; B60R 9/065; B60R 9/06; B60R 5/04; B60R 5/041; B60R 13/01; B60R 13/013; B60P 1/003; B62D 33/0207; B62D 33/0273

USPC ...................... 296/37.6, 26.09; 224/403, 404
See application file for complete search history.

(56) References Cited

U.S. PATENT DOCUMENTS

| 2,784,027 A | 3/1957 | Temp |
| 2,852,303 A | 9/1958 | Hopson |
| 4,283,083 A | 8/1981 | Johnson |
| 4,305,695 A | 12/1981 | Zachrich |
| 4,522,326 A | 6/1985 | Tuohy, III |
| 4,573,731 A | 3/1986 | Knaack et al. |

(Continued)

*Primary Examiner* — Corey N Skurdal
(74) *Attorney, Agent, or Firm* — Langer, Grogan & Diver, P.C.; Robert S. Silver; Joseph F. Murphy

(57) ABSTRACT

A modular universal non-invasive retractable/extendable storage system for a bed of a vehicle, said system including: a. a storage component and b. a frame component fit on the bed of the vehicle; the frame component for supporting said storage component; the frame component further including at least one length adjustable transverse frame member and at least two spaced apart longitudinal frame members connected normal to the at least one length adjustable transverse frame member; the at least one length adjustable transverse frame member further including a length adjustable vertical frame member at each end thereof, each of each length adjustable vertical frame member including a compression zone for a compression fit of the frame component on the bed of the vehicle without the need of piercing the bed of the vehicle; each of the at least two spaced apart longitudinal frame members further including a storage component track for receiving a side of the storage component and for movement of the storage component in a horizontal plane from a first longitudinally retracted position to a second longitudinally extended position in relation to the bed of the vehicle.

33 Claims, 28 Drawing Sheets

(56) References Cited

U.S. PATENT DOCUMENTS

| | | | | |
|---|---|---|---|---|
| 4,824,158 | A | 4/1989 | Peters et al. | |
| 4,830,242 | A | 5/1989 | Painter | |
| 4,950,123 | A | 8/1990 | Brockhaus | |
| 4,993,088 | A | 2/1991 | Chudik | |
| 5,052,878 | A | 10/1991 | Brockhaus | |
| 5,513,941 | A | 5/1996 | Kulas et al. | |
| 5,845,952 | A | 12/1998 | Albertini et al. | |
| 5,897,154 | A | 4/1999 | Albertini et al. | |
| 5,924,616 | A | 7/1999 | Shives | |
| 5,934,725 | A | 8/1999 | Bowers | |
| 5,938,262 | A | 8/1999 | Mills | |
| 5,964,492 | A | 10/1999 | Lyon | |
| 5,988,722 | A * | 11/1999 | Parri | B60P 1/003 224/403 |
| 6,065,792 | A | 5/2000 | Sciullo et al. | |
| 6,264,083 | B1 | 7/2001 | Pavlick et al. | |
| 6,318,781 | B1 | 11/2001 | McKee | |
| 6,328,364 | B1 | 12/2001 | Darbishire | |
| 6,390,525 | B2 | 5/2002 | Carpenter et al. | |
| 6,398,283 | B1 | 6/2002 | Knudtson et al. | |
| 6,460,744 | B2 | 10/2002 | Lance et al. | |
| 6,464,274 | B2 | 10/2002 | Mink et al. | |
| 6,491,331 | B1 | 12/2002 | Fox | |
| 6,629,714 | B2 | 10/2003 | Campbell | |
| 6,695,375 | B1 | 2/2004 | May | |
| 6,712,416 | B1 | 3/2004 | Darbishire et al. | |
| 6,726,073 | B2 * | 4/2004 | Sutton | B60R 9/00 224/403 |
| 6,758,508 | B2 * | 7/2004 | Weyhrich | B62D 33/02 296/100.18 |
| 6,692,204 | B1 | 12/2004 | Ricard | |
| 6,860,536 | B1 | 3/2005 | Schimunek | |
| 6,866,316 | B1 * | 3/2005 | Harder | B60R 11/00 248/300 |
| 6,883,849 | B2 * | 4/2005 | Hebert | B60P 1/003 224/403 |
| 6,923,354 | B2 | 8/2005 | Axelson | |
| 7,025,398 | B1 | 4/2006 | Montagna et al. | |
| 7,052,066 | B2 | 5/2006 | Emery et al. | |
| 7,083,219 | B1 | 8/2006 | Gregory | |
| 7,111,887 | B2 * | 9/2006 | Cooley | B60P 1/003 296/26.09 |
| 7,175,060 | B1 * | 2/2007 | Carpenter | B60P 1/003 224/281 |
| 7,338,104 | B1 | 3/2008 | Bejin | |
| 7,543,872 | B1 | 6/2009 | Burns et al. | |
| 7,543,873 | B1 * | 6/2009 | Thornsberry | B60P 1/003 224/403 |
| 8,757,458 | B2 | 6/2014 | Nebel | |
| 8,840,166 | B1 | 9/2014 | Derbes et al. | |
| 9,254,792 | B2 | 2/2016 | Patton et al. | |
| 9,527,454 | B2 | 12/2016 | Smith et al. | |
| 9,756,941 | B1 * | 9/2017 | Rowland | A47B 88/40 |
| 99,908,661 | | 3/2018 | Homer | |

\* cited by examiner

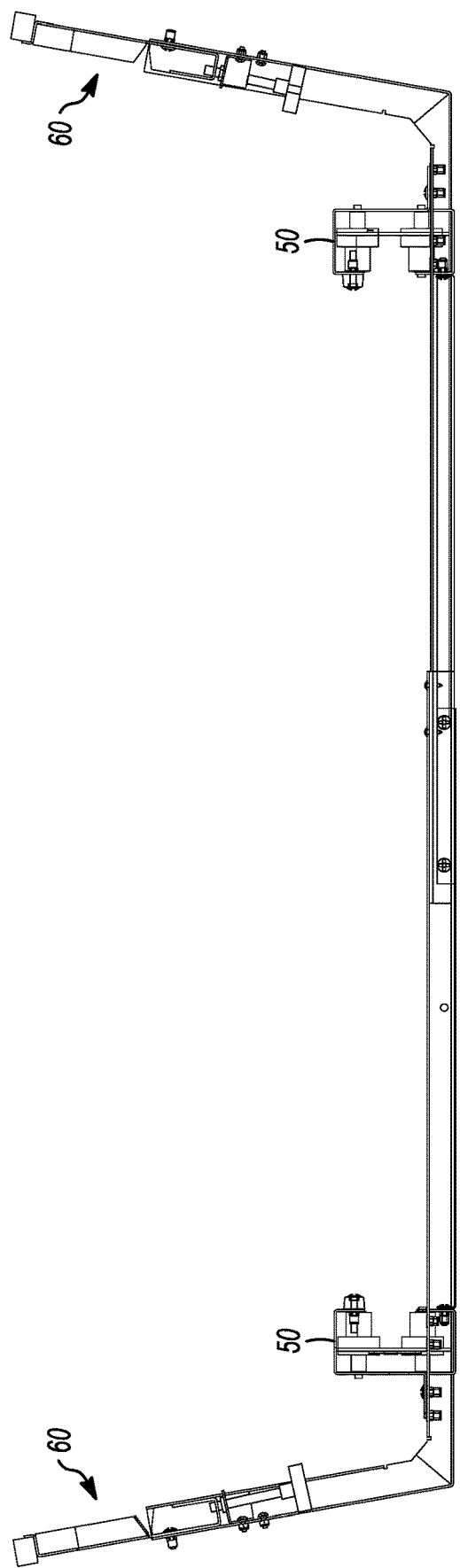

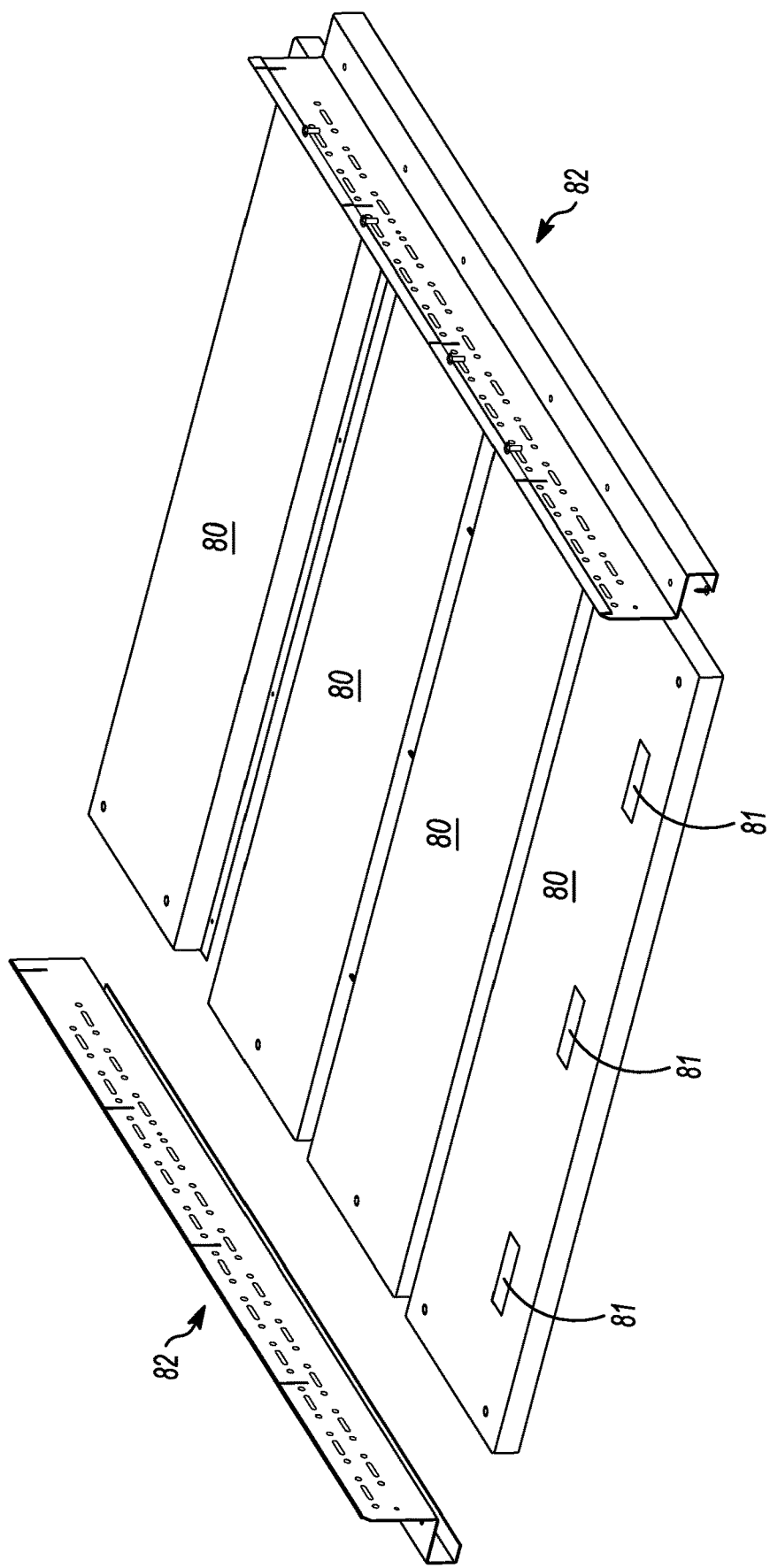

MODULAR LIGHT WEIGHT UNIVERSAL NON-INVASIVE RETRACTABLE STORAGE SYSTEM FOR A TRUCK BED, VAN AND/OR A TRAILER BED

FIELD OF THE DISCLOSURE

This disclosure relates to a modular universal non-invasive retractable/extendable storage system for a truck bed, van and/or trailer bed that is easily assembled, disassembled and installed, removed.

BACKGROUND

Many storage systems for truck beds and/or trailer beds are heavy requiring at least two individuals to assemble and install the system in truck beds. Many of these storage systems also require modification of the truck bed and/or trailer bed (such as drilling holes into the truck bed and/or welding the storage system to the truck bed. These modifications not only alter the truck bed but may also reduce the value of the vehicle after alteration. Secondly, these securement methods do not facilitate facile disassembly and removal of the storage system from the truck bed (i.e. time-consuming removal of bolts and expensive removal of soldered joints) and thirdly, these securement methods result in the alteration of the truck bed that may not be brought back to the original condition. Many storage systems are difficult to assemble and install, due to their heavy weight. Furthermore. Many storage systems do not allow for customized and adjustable compartment location therein. There is a need for a truck bed storage system that is lightweight and easy to assemble/disassemble, install/remove and operate. There is a need for a truck bed storage system that is non-invasive yet secured onto the truck bed.

SUMMARY

According to one aspect, there is provided a modular universal non-invasive retractable/extendable storage system for a bed of a vehicle, such as a pick-up truck, van, SUV or trailer, or the like, said system comprising: a storage component horizontally movable from a first to a second position; and a frame component fit onto the bed of said vehicle; said frame component for supporting said storage component; said frame component further comprising at least one length adjustable transverse frame member and at least two spaced apart longitudinal frame members connected normal to said at least one length adjustable transverse frame member; said at least one length adjustable transverse frame member further comprising a length adjustable vertical frame member at each end of said at least one length adjustable transverse frame member, each of said length adjustable vertical frame members further comprising a compression member at a top end thereof for compression fitting of said frame component onto the bed of a vehicle without the need of piercing said bed of said vehicle; each of said at least two spaced apart longitudinal frame members further comprising a storage component track, each storage component track for receiving a respective side of said storage component and for movement of said storage component in a horizontal plane from a first longitudinally retracted position to a second longitudinally extended position in relation to said bed of said vehicle.

According to one alternative, each of said length adjustable vertical frame member forms an angle in relation to said at least one length adjustable transverse member of from about 90 degrees to about 105 degrees from a center of said bed towards a side of said bed of said vehicle. In one alternative, said angle is greater than 90 degrees. In another alternative said angle is about 100 degrees.

According to yet another alternative, said at least one length adjustable transverse frame member further comprises a locking component to lock said at least one length adjustable frame member to a desired length.

According to yet another alternative, each of said length adjustable vertical frame members further comprise a locking component to lock each of said length adjustable vertical frame members to a desired length.

According to one alternative, said storage component comprises a bottom, a front wall, back wall, a first side wall and a second side wall.

According to yet another alternative, said modular non-invasive system further comprises a storage component lock to lock said storage component in a desired location along said storage component track. In one alternative, said storage component lock locks said storage component in a retracted position and in the alternate in an extended position. In one alternative, said storage component lock is a spring hinge pin at one end of said storage component, said spring hinge pin in an engaged position engages with a spring hinge pin receiver on one end of at least one of said storage component tracks.

In another alternative, said modular non-invasive system further comprises a secondary storage component lock to lock said storage component in a desired location along said storage component track. In one alternative, said secondary storage component lock locks said storage component in a retracted position and in the alternate in an extended position. In one alternative, said secondary storage component lock is a latch barrel slide bolt at one end of said storage component, said latch barrel slide bolt in an engaged position engages with a latch barrel slide bolt receiver on one end of at least one of said storage component tracks. In one alternative, said modular non-invasive system further comprises a plurality of secondary storage component locks.

In one alternative, each of said storage component tracks comprises a plurality of rollers for movement of said storage component along said storage component tracks.

In one alternative, said plurality of rollers run a length of each of said storage component tracks.

In yet another alternative, said plurality of rollers are situated at top and a bottom of each of said storage component tracks. Said top plurality of rollers and said bottom plurality of rollers being separated a vertical distance apart from each other to movably receive a first end of the bottom and a second end of the bottom of said storage component, respectively.

In one alternative, said compression member comprises a body with a bottom end and a top end. In one alternative said body is wider at said top end than at said bottom end.

In one alternative, said top end of said compression member further comprises a resilient portion running a length of said top end. In a further alternative, said resilient portion runs the length of said top end.

In another alternative, said top end further comprises a ledge along the length thereof to receive said resilient portion. In one alternative, said ledge has a bottom face and a side face normal to said bottom face.

In another alternative, an edge of said resilient portion sits at a terminus of the bottom face and side face of said ledge.

In one alternative, said resilient portion is a rubber pad or the like.

In one alternative said resilient portion is square in cross profile.

In one alternative, said compression member is adjustable in position along said vertical adjustable frame member. In one alternative, said compression member is adjustable in position along said vertical adjustable frame member via a compression member position adjuster on said vertical adjustable frame member.

In one alternative, said top end of said compression member engages a portion of a top inside corner along the sidewall of said bed. In one alternative, said resilient portion on said top end of said compression member engages a portion of a top inside corner along the sidewall of said bed.

In yet another alternative, said compression member adjuster comprises a vertically angled inline tensioner. In yet another alternative, said vertically angled inline tensioner is secured onto said adjustable vertical frame member by a bracket. In one alternative, said bracket is adjustable in position in relation to said vertical frame member.

In yet another alternative, said vertically angled inline tensioner is a thumbscrew.

According to yet another alternative, said bottom end and a portion of said body of said compression member is slidably connected to said vertical length adjustable frame member. In one alternative a portion of each side of said bottom end and said body of said compression member slidably engages with a compression member channel running along each side of said vertical length adjustable frame member.

According to yet another alternative, said compression member and said vertical length adjustable frame member further comprise a height locking mechanism to lock said compression member along said vertical length adjustable frame member to a desired position.

In one alternative, said height locking mechanism comprises at least one vertically elongated slot on said compression member and at least one complementary set screw on said vertical length adjustable frame member in line with said at least one vertically elongated slot on said compression member allowing for locking the position of the compression member in relation to said vertical length adjustable frame member. In one alternative, said height locking mechanism comprises two spaced apart vertically oriented elongated slots on said compression member and a complementary set screw, for each vertically oriented elongated slot, on said vertical length adjustable frame member, each set screw being in line with each of said two vertically oriented elongated slots on said compression member allowing for locking the position of the compression member in relation to said vertical length adjustable frame member.

In one alternative, said at least one length adjustable transverse frame member comprises a female portion and a male portion, in slidable engagement with each other allowing for adjustment of distance between each of said vertical length adjustable frame members. In one alternative, each of said storage component tracks further comprise an opening for receiving the male portion and female portion, respectively, of said at least one length adjustable transverse frame member.

In one alternative said opening for receiving the male portion and female portion is centrally situated along the length of each of said storage component tracks. In one alternative, said opening for receiving the male portion and female portion is situated below the plurality of rollers of each of said storage component tracks.

In another alternative, said at least one length adjustable transverse frame member comprises two male portions and a central female portion, each of said two male portions being in slidable engagement with said centrally located female portion allowing for adjustment of distance between each of said vertical adjustable frame members.

In one alternative, each of said plurality of rollers comprise a first diameter roller portion and a second diameter roller portion. Said first diameter roller portion being greater than said second diameter roller portion forming a roller wall normal to a central axis of each of said plurality of rollers when transitioning from said first diameter roller portion to said second diameter roller portion. Said roller wall reducing any unwanted lateral motion of said storage component during retraction and extension of said storage component along each of said storage component tracks without interfering with longitudinal motion of said storage component during retraction and extension of said storage component along each of said storage component tracks.

In one alternative, said vertical distance between the top plurality of rollers and the bottom plurality of rollers is greater than a thickness of the bottom of the storage component. In one alternative, said vertical distance is between the second diameter roller portion of the plurality of rollers.

In another alternative, said modular universal non-invasive retractable/extendable storage system further comprises a second transverse frame member spaced apart from the at least one length adjustable transvers frame member. Each end of said second transverse frame member being connected to an end of each of said storage component tracks. In one alternative, said second transverse frame member is length adjustable. In another alternative, said second transverse frame member in non-adjustable in length. Said second length adjustable transverse frame member comprising a female portion and a male portion in slidable engagement with each other allowing for adjustment of length of said second length adjustable transverse frame member.

In another alternative, said second length adjustable transverse frame member further comprises a lock mechanism to lock said second length adjustable transverse frame member to a desired length.

In another alternative, said second transverse frame member is not length adjustable and comprises a length to accommodate a truck bed of a predefined width.

In another alternative, said modular universal non-invasive retractable/extendable storage system further comprises a second and third transverse frame member spaced apart from the at least one length adjustable transverse frame member. Each end of said second and third transverse frame member being connected to an end of each of said storage component tracks. In one alternative, each of said second and third transverse frame member is length adjustable. In another alternative, each of said second and third transverse frame member is non-adjustable in length. Each of said second and third length adjustable transverse frame member comprising a female portion and a male portion in slidable engagement with each other allowing for adjustment of length of said second and third length adjustable transverse frame member.

In another alternative, each of said second and third length adjustable transverse frame member further comprises a lock mechanism to lock each of said second and third length adjustable transverse frame member to a desired length.

In another alternative, each of said second and third transverse frame member is not length adjustable and comprises a length to accommodate a truck bed of a predefined width.

In one alternative, said storage component comprises a flat bottom panel. In another alternative said storage component comprises a flat bottom panel comprising a plurality of modular interconnectable bottom panels forming a flat bottom panel.

In another alternative, said storage component further comprises a handle portion to assist a user to retract and extend the storage component along the storage component tracks.

In one alternative, said handle portion is integral with said flat bottom panel. in another alternative, said handle portion integral with said flat bottom panel is an elongated slot on said flat bottom panel, said elongated slot running parallel to the at least one length adjustable transverse member. In another alternative, said handle portion integral with said flat bottom panel is a plurality of spaced apart elongated slots running parallel to the at least one length adjustable transverse member.

In one alternative, said bottom panel with said handle portion further comprises a spacer along a bottom thereof. Said spacer for increasing stability of said panel when said storage component is carrying a heavy load. Said spacer mitigating any unwanted flexing of said panel by said spacer resting on a portion of an opened tailgate of a truck.

In one alternative, said bottom panel with said handle portion further comprises a height adjustable spacer along a bottom thereof. Said height adjustable spacer for increasing stability of said panel when said storage component is carrying a heavy load and accommodating various truck beds and tailgates. Said height adjustable spacer mitigating any unwanted flexing of said panel by said spacer resting on a portion of an opened tailgate of a truck.

In one alternative, said storage component further comprises two side walls extending upward from said flat bottom panel. In one alternative, each of said two side walls are removable.

In another alternative, said storage component further comprises one back wall extending upward from said flat bottom panel. In one alternative, said one back wall is removable.

In one alternative, said one back wall is pivotally connected to said flat bottom panel allowing for said back wall to rotate along the length of said flat bottom panel from a vertical closed position to a horizontal open position.

In another embodiment, said back wall is not rotatable.

In another alternative, said storage component further comprises one from wall extending upward from said flat bottom panel.

In one alternative, each of said two side walls comprise a storage component track engagement portion running a length of each of said two side walls. In another alternative, said storage component track engagement portion has a height that is less than the distance between the top plurality of rollers and the bottom plurality of rollers of each of said storage component tracks.

In one alternative, said storage component track engagement portion of each side wall further connects with said flat bottom panel to secure each of said side walls to said flat bottom panel.

In one alternative, each of said storage component track engagement portions further comprise a resilient bumper at each end thereof for engaging with a bumper stop at each of said storage component track, respectively, preventing said storage component from running off said storage component track.

According to another aspect, there is provided a method of assembling a modular universal non-invasive retractable/extendable storage system as described herein. Said method comprising: i) assembling the storage component comprising: a) connecting 4 modular bottom panels forming the bottom of the storage component and optionally secure and add lockout and secure with screws; b) connecting each of the two side walls to a side of the bottom of the storage component and secure screw; c) connecting a back wall to an end of the bottom of the storage component and secure the back wall to the bottom with screws Insert back tailgate wall and add lock-out. Secure with screws; and ii) in vehicle bed, assembling the frame component comprising: a) lay out a left transverse member near the left side of the vehicle bed and lay out a right transverse member near the right side of the vehicle bed, transversely aligning the left and right transverse member with each other; b) connect a left storage component track to the left transverse member and a right storage component track to the right transverse member; c) depending on size of vehicle bed use appropriate fastener pattern to fasten left storage component tack to left transverse member and right storage component track to right transverse member; d) insert the male portion of the right transverse member into the female portion of the left transvers member; iii) insert each compression member into the respective vertical member and extend each compression member to make contact with inner corner of vehicle bed side wall and top lip; iv) Insert left and right edge of assembled storage component into left and right storage component track, respectively; v) align assembled storage in the storage component track and ensure transverse members are fully extended and compression members are snug with inner corner ensuring a tight fit in the vehicle bed; vi) tighten all connections; vii) move storage component along storage component track forward into vehicle bed until center of length adjustable transverse member is visible; viii) insert and tighten keeper screws; ix) move storage component forward until front extends past storage component track; x) install front and rear resilient bumpers. Retract Tray— engage lock out.

According to one alternative, there is provided an alternative method of assembling a modular universal non-invasive retractable/extendable storage system as described herein. Said method comprising:

Step 1: Assemble the Sub-Frame:

i) overlay the left and right roller banks onto the main beam. Insert ¾" machine screws;

ii) insert the front and rear braces between the roller banks. Secure with ¾" machine screws and tighten;

iii) tighten machine screws in i) to secure the roller banks to the main beam.

iv) affix slide lock on the top surface of the left (or right) roller bank using black tap screws;

v) choose one pair of rivnuts on the "L" bracket to secure the threaded rod assembly bracket. Choose the pair which allows the fully seated compression arm to i) clear the sidewall lip of your truck, and ii) provides enough threaded rod travel to ensure the compression arm is secured underneath the sidewall. (Note: Due to varying sidewall heights, the lowest pair of rivnuts generally (but not always) accommodate Chrysler Ram/Ford F-150, and the higher pairs GM Silverado/Sierra). Attach the threaded rod assembly bracket to the "L" bracket using two ¾" machine screws;

vi) insert the left and right angle ("L") brackets under the roller banks and into the main beam. Insert both "L" brackets all the way into the main beam. Temporarily insert one ¾" machine screw through the outside roller bank flange and into the base of the "L" bracket to stop bracket from sliding out. Note: The "L" brackets will be adjusted once the sub-frame is positioned in the bed of the truck;

vii) affix the compression foam to each of the compression arms;

viii) insert the compression arms into the "L" brackets. Ensure the threaded rod is fully reversed allowing the compression arm to sit down in the "L" bracket channel. Insert two ¾" machine screws through the compression arm and into the "L" bracket—do not tighten.

Step 2: Installing the Assembled Sub Frame into the Bed of Your Truck:

Aligning the Sub-Frame in the Bed of Your Truck:

i) place the sub-frame into the bed of your truck. Note: You may need to insert the sub-frame on a slight angle to get around any obstruction at the back of the bed;

ii) Line up the front of the roller bank with the end of the truck bed, inset approx. ½"-1". Note: ensure the tailgate closes without making contact with the front of the roller bank;

iii) check the distance from the outside of the roller bank and the wheel well—make sure it is the same on both sides. (i.e. Centre the sub-frame between the wheel wells).

Securing the Sub-Frame in the Bed of Your Truck:

i) remove the screw that was temporarily inserted into the base of the "L" bracket (refer Step 1, vi);

ii) pull out the "L" bracket an equal distance on both sides until the angle of the "L" bracket allows the compression arm to fully extend under the side rail. Note: The rubber feet of the "L" bracket should be resting in a valley on the bed of the truck, not on a rib;

iii) extend the threaded rod by turning the knob clockwise until the compression foam touches the underside of the sidewall rail. Note: If there are plastic plugs holding down the sidewall cap, ensure the compression arm is behind the plugs before compressing. Compress until snug. Do not fully tighten at this point. (Repeat on the other side). Secure the base of the "L" bracket to the outside roller bank flange with two ¾" machine screws;

iv) apply full compression on both sides until the sub-frame is fully secured. Important: To ensure the unit is secure, pull back on the "L" bracket until it does not move when pulled upon;

v) once the "L" bracket is secured under the side rail, tighten the two ¾" machine screws through the compression arm, and into the "L" bracket.

Step 3: Assembling the Tray:

Connect 4 Tray Sections and Secure with Tap Screws:

i) turn panels upside down (careful not to scratch the surface) and lay panels laterally, from front to back;

ii) place the 2 middle sections side to side and secure with 3 tap screws under panel lip;

iii) secure the rear panel to the back-middle panel with 4 tap screws, noting the overlapping lip;

iv) secure the front panel (with hand cut-outs on the top surface) to the front-middle panel with 3 tap screws;

v) The front panel has an adjustable support panel (underneath) with 3 settings to accommodate various tailgate configurations. An upper, middle and lower setting. Note: Generally (but not always) the upper setting (meaning that most of the support panel is inside the cavity of the front panel) accommodates GM Silverado/Sierra, the mid setting Chrysler Ram, and the lowest setting Ford F-150. IMPORTANT: Choose the setting that provides the smallest amount of clearance (gap) between the bottom of the height adjustable spacer (support panel), and the surface of the tailgate when the tray is fully extended. Ensure the support panel does not rub the tailgate when the tray is fully extended with no load.

Side and Back Wall Assembly:

i) connect the left and right sidewalls to the tray surface. Secure with eight ¾" machine screws provided. Note: The first threaded opening on each side wall is for the front tray stopping post;

i)b: The last threaded opening one each side wall is for the rear tray stopping post which is not inserted until Step 4, ii);

ii) insert the 2 front tray stopping posts using the 1¾" machine screws and spacers. (Do not install back tray stoppers at this time);

iii) insert the back wall into the last side wall slot. (The back wall can be removed to accommodate larger items). Note: the additional rear side wall slots can be used to store dividers (dividers purchased separately).

Step 4: Insert the Tray into the Sub-Frame:

i) carefully insert the Tray into the roller banks. Note: The tray will rest on the surface of the bottom rollers and be guided by the roller shoulder. Push the tray all the way in until the front tray stopper makes contact with the front rubber roller bank stopper. Note: This is the fully retracted position;

ii) pull the Tray forward and stop when the front of the tray is flush with the end of the tailgate;

iii) Insert the two rear tray stopping posts (1¾" machine screw and spacer) into the last threaded opening at the back of each side wall;

iv) Pull the tray out until the stopping post makes contact with the rear roller bank stopper. Note: This is the fully extended position. You can engage the slide lock at the fully extended position to stop the tray from rolling back into the roller bank;

v) Fully retract the Tray and engage the slide lock.

BRIEF DESCRIPTION OF THE FIGURES

FIG. 4B is a front view of the modular light weight universal non-invasive retractable storage system without the storage component in the storage component racks of FIG. 4A;

FIG. 13A is an exploded top view of the storage component, in one alternative;

DETAILED DESCRIPTION

Figure 1:
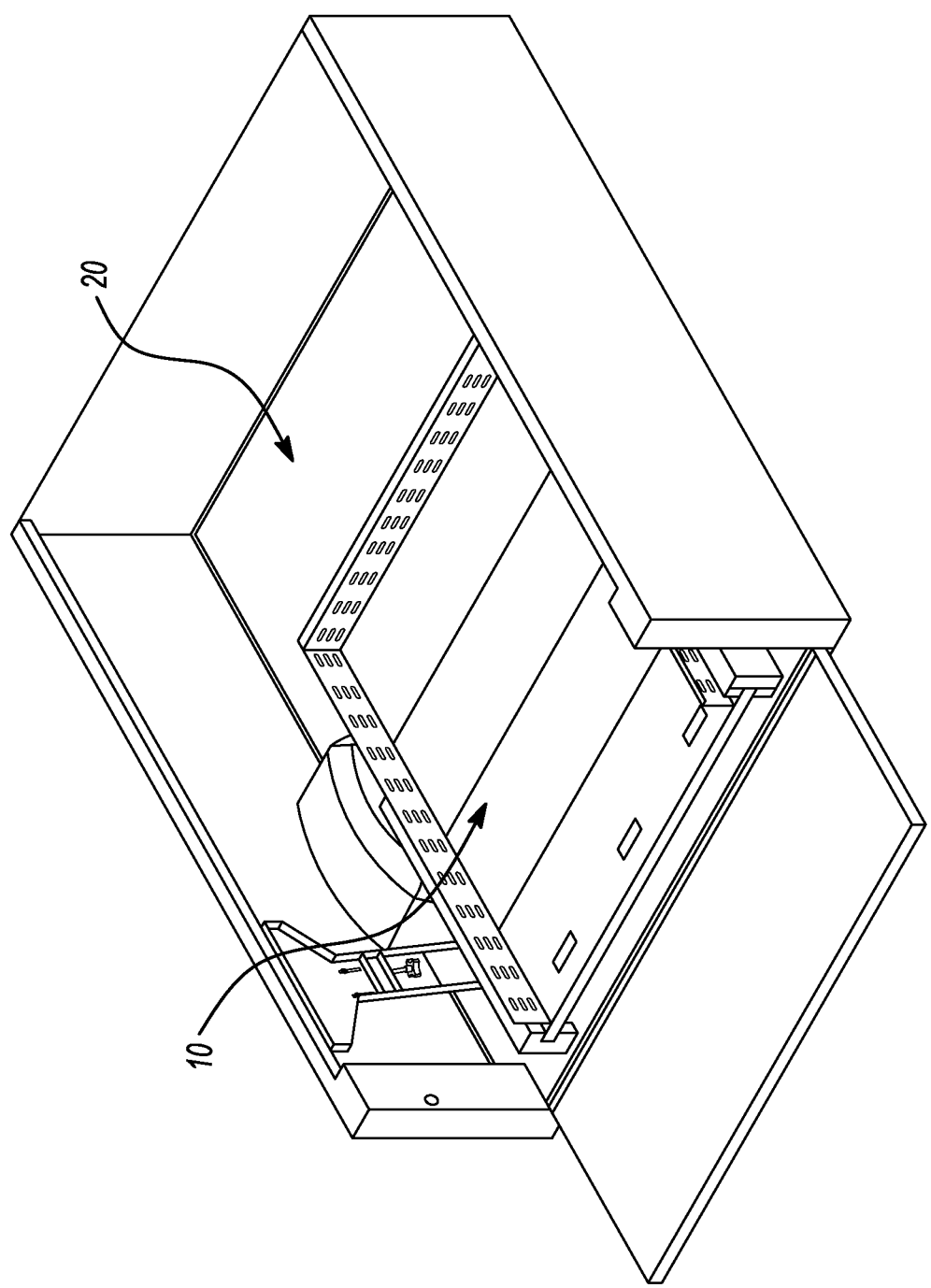
FIG. 1 is a perspective view of a modular light weight universal non-invasive retractable storage system in a fully retracted position in a truck bed, according to one alternative.
Figure 2:
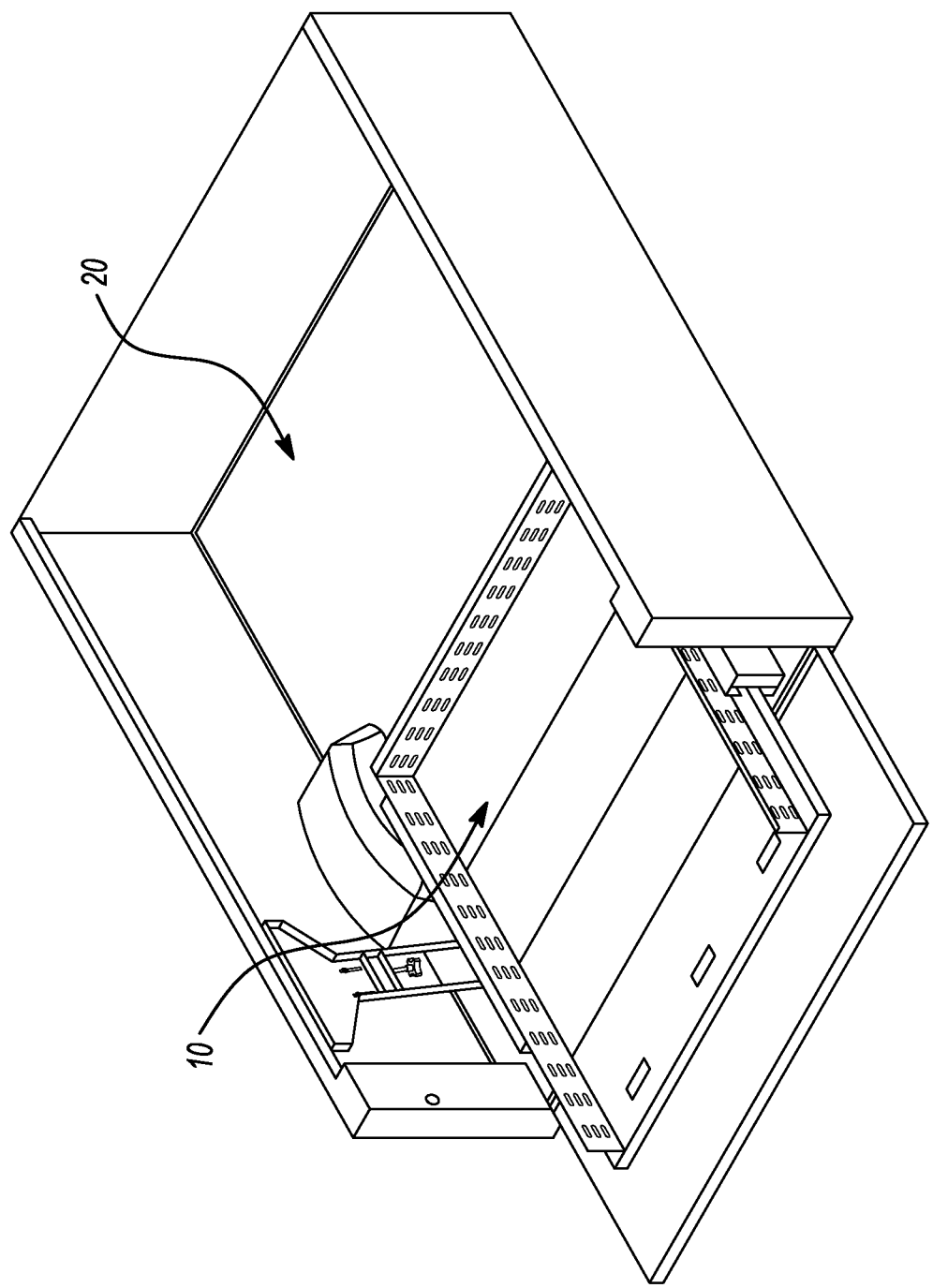
FIG. 2 is a perspective view of a modular light weight universal non-invasive retractable storage system in a half extended position in a truck bed, according to one alternative.
Figure 3:
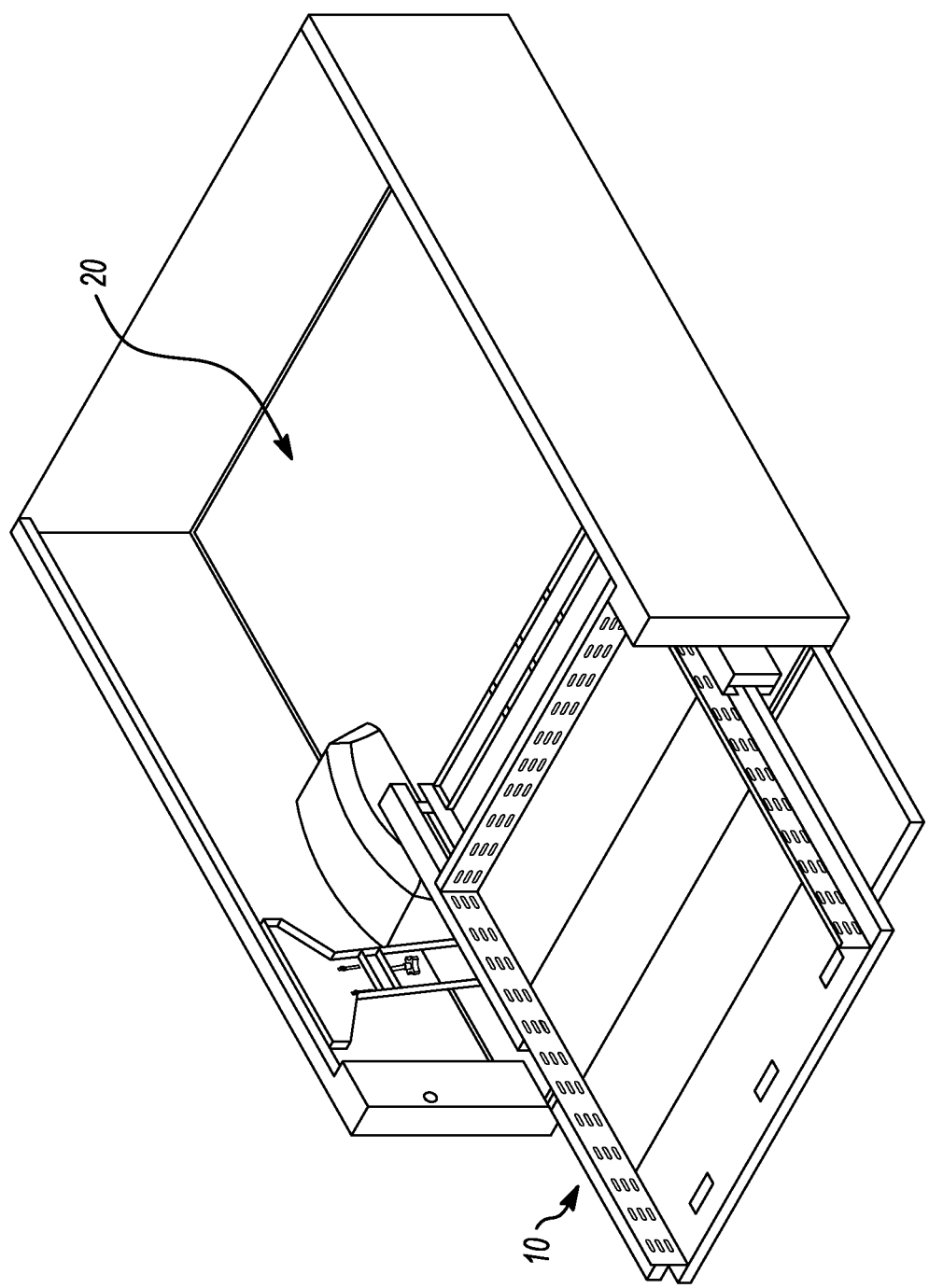
FIG. 3 is a perspective view of a modular light weight universal non-invasive retractable storage system in a fully extended position in a truck bed, according to one alternative.

Referring now to FIGS. 1, 2 and 3, there is depicted a modular lightweight universal non-invasive retractable storage system 10, according to one alternative, in three different positions, namely a retracted position (FIG. 1) wherein the system 10 is fully retracted in the truck bed 20; half-extended position (FIG. 2) wherein the system 10 is half-extended along the truck bed 20; and fully extended position (FIG. 3) wherein the system 10 is fully extended out along the truck bed 20.

Figure 4A:
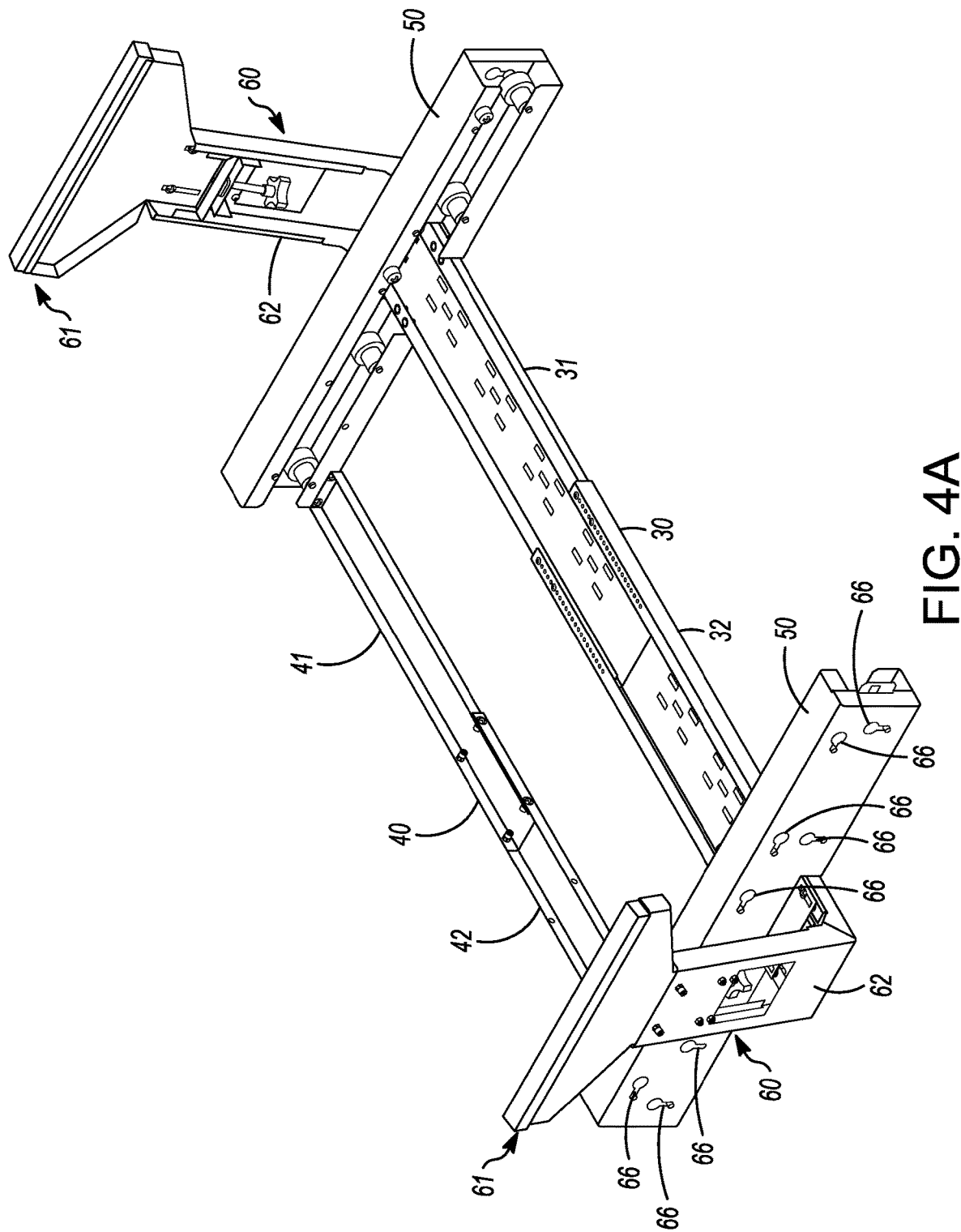
FIG. 4A is a perspective view of a modular light weight universal non-invasive retractable storage system without the storage component in the storage component racks, according to one alternative.

Referring now to FIGS. 4A and 4B, the first and second length adjustable transverse members 30 and 40 and left and right storage component tracks 50 and length adjustable vertical members 60 are depicted, according to one alternative. In this alternative, length adjustable vertical members 60 each form an angle of 100° in relation to first length adjustable transverse member 30. However, in other alternatives, the angle formed may be greater than 90°. In other alternatives, the angle formed may be from greater than 90° to less than about 110°. As best seen in FIG. 4A, first length adjustable transverse member 30 is comprised of a male member 31 and female member 32. Male member 31 fits into female member 32 allowing for adjustable length of the first length adjustable transverse member 30. In this alternative, male member 31 is a C-channel profile and female member 32 is a C-channel profile wherein the male member 31 C-channel profile is smaller than the female member 32 C-channel profile. Similarly, second length adjustable transverse member 40 comprises a male member 41 and female member 42. Male member 41 fits into female member 42 allowing for adjustable length of the second adjustable transverse member 40. In this alternative, male member 41 is a C-channel profile and female member 42 is a C-channel profile wherein the male member 41 C-channel profile is smaller than the female member 42 C-channel profile. As best seen in FIG. 4A, length adjustable vertical members 60 each comprise a compression member 61 that fits into angled member 62 allowing for adjustable length of the length adjustable vertical members 60. Each of left and right storage track 50 further comprise on each respective outside wall, a plurality of roller receivers 66, to accommodate the rollers.

Figure 5:
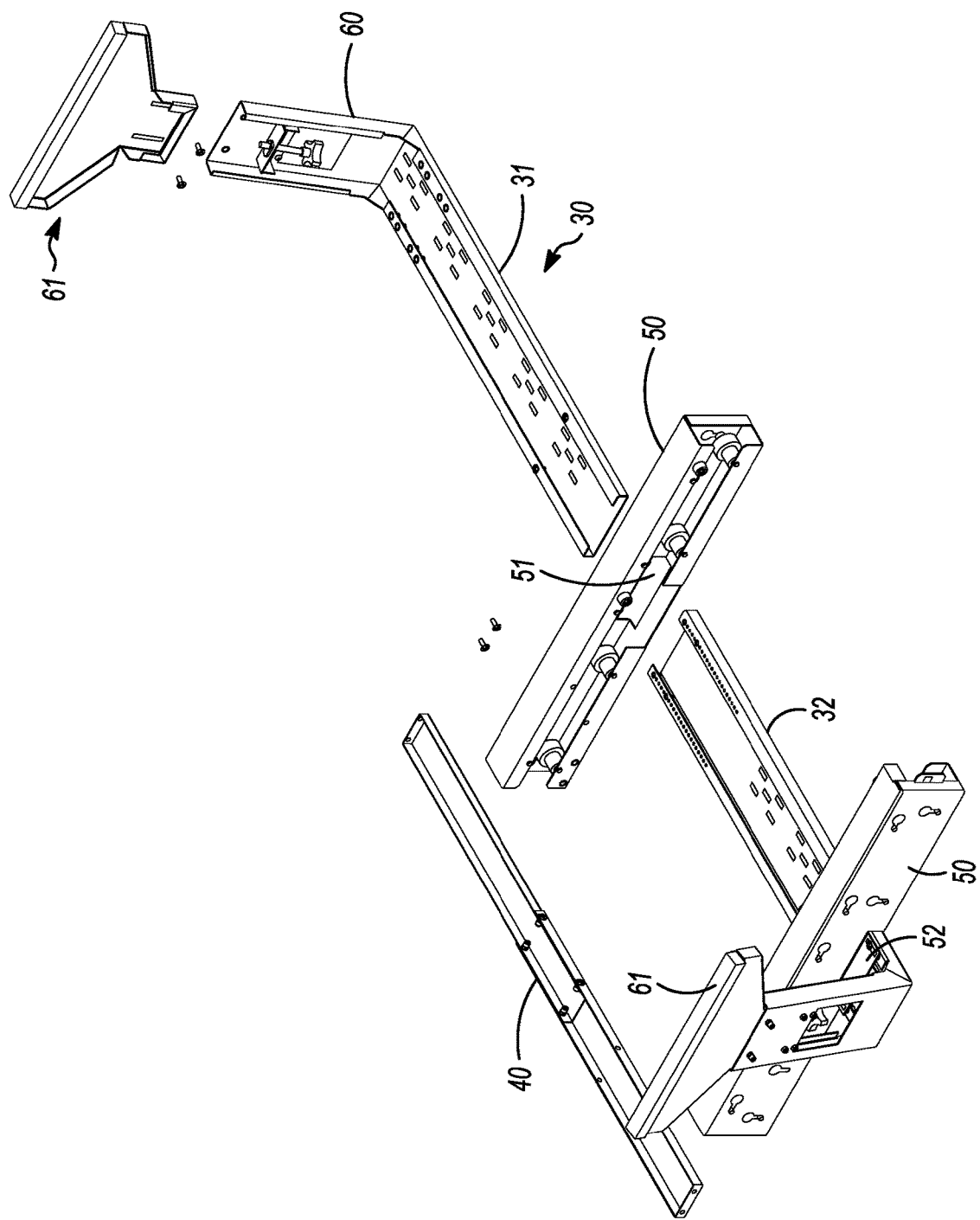
FIG. 5 is an exploded view of FIGS. 4A and 4B.

Referring now to FIG. 5, there is depicted an exploded view of the first and second length adjustable transverse members 30, 40, left and right storage component tracks 50 and length adjustable vertical members 60. Each of male member 31 and female member 32 of the first length adjustable transverse member 30 fit through a first transverse member aperture 51 found near the middle and bottom of each of left and right storage component tracks 50. Each aperture 51 on each storage component track 50 is sized and shaped to accommodate male 31 and female member 32 such that each member 31 and 32 are securely engaged onto each of the storage component tracks 50, respectively. In one alternative, proximate (or near) aperture 51, there is a securing plate 52 extending normal to the back of each storage component track 50. Each securing plate comprises two spaced apart transverse running slots for alignment (and sitting on) with screw holes on male 31 and female 32 members.

Figure 6:
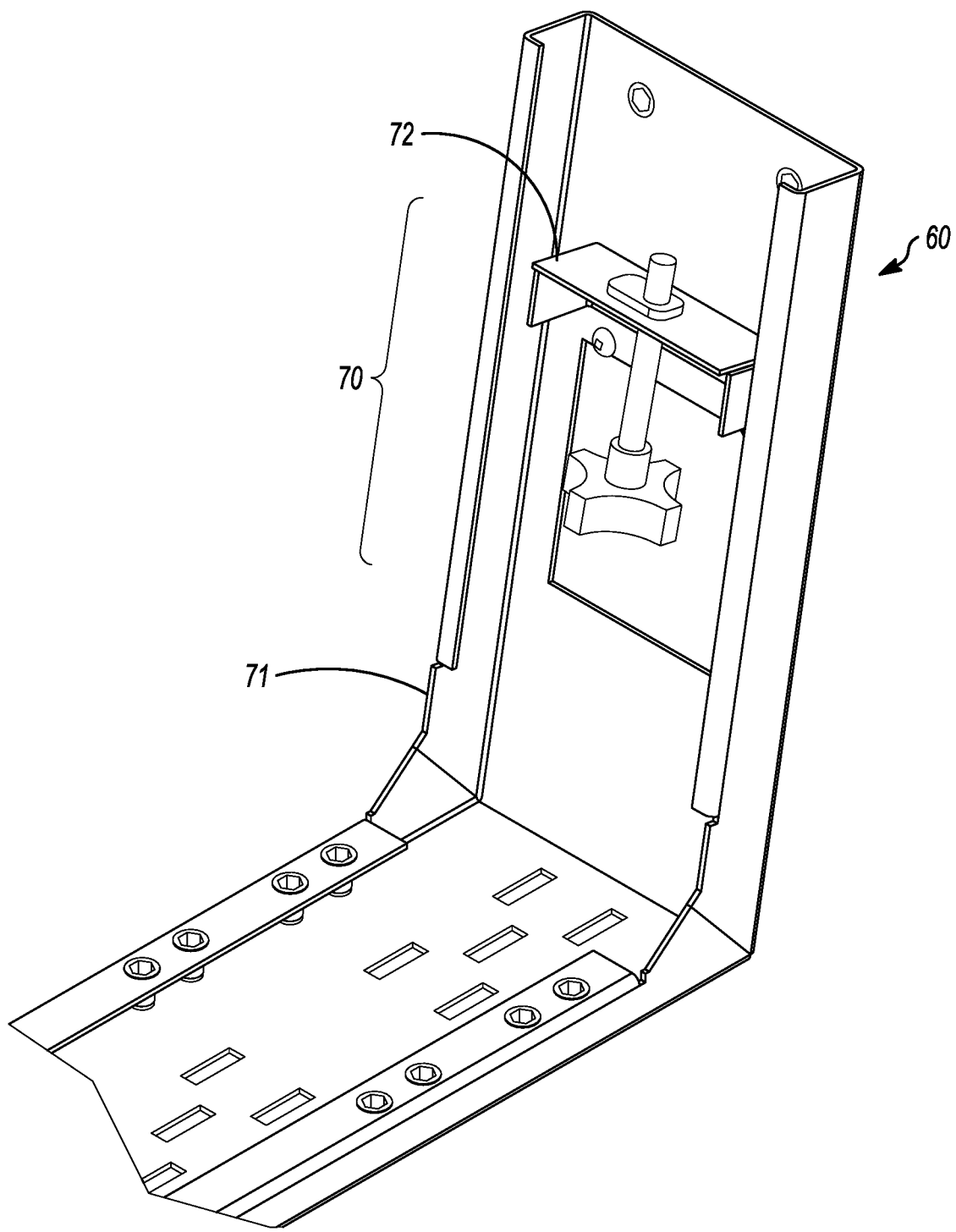
FIG. 6 is a magnified view of the tensioner, according to one alternative.

Referring now to FIG. 6, there is depicted a magnified view of a compression member tensioner 70, in this alternative, a thumbscrew 71 connected to a thumbscrew plate 72 wherein rotation of the thumbscrew, depending on direction of rotation, will urge the compression member towards the inner top corner of the truck side wall or away therefrom. Typically towards the inner top corner during installation of the system 10, and away therefrom during disassembly. Also as best seen in FIG. 6, angled member 62 is a C-channel profile allowing for compression member 61 (See FIG. 4B) to move along the C-channel during rotation of the compression member tensioner 70 and remain in the C-channel.

Figure 7A:
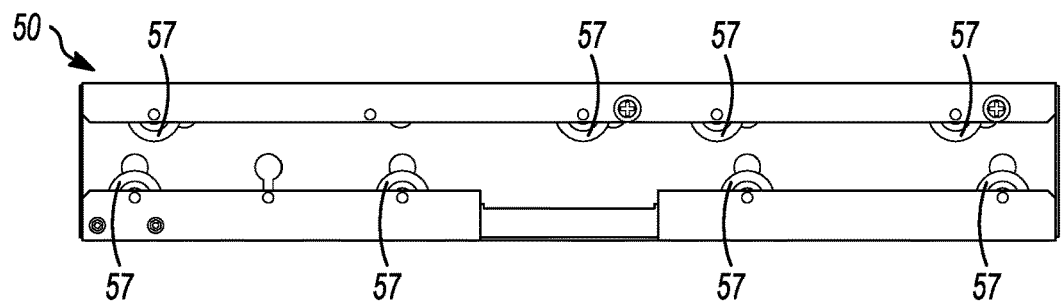
FIGS. 7A, 7B and 7C are a front, perspective and end view of a storage component rack, according to one alternative.
Figure 7B:
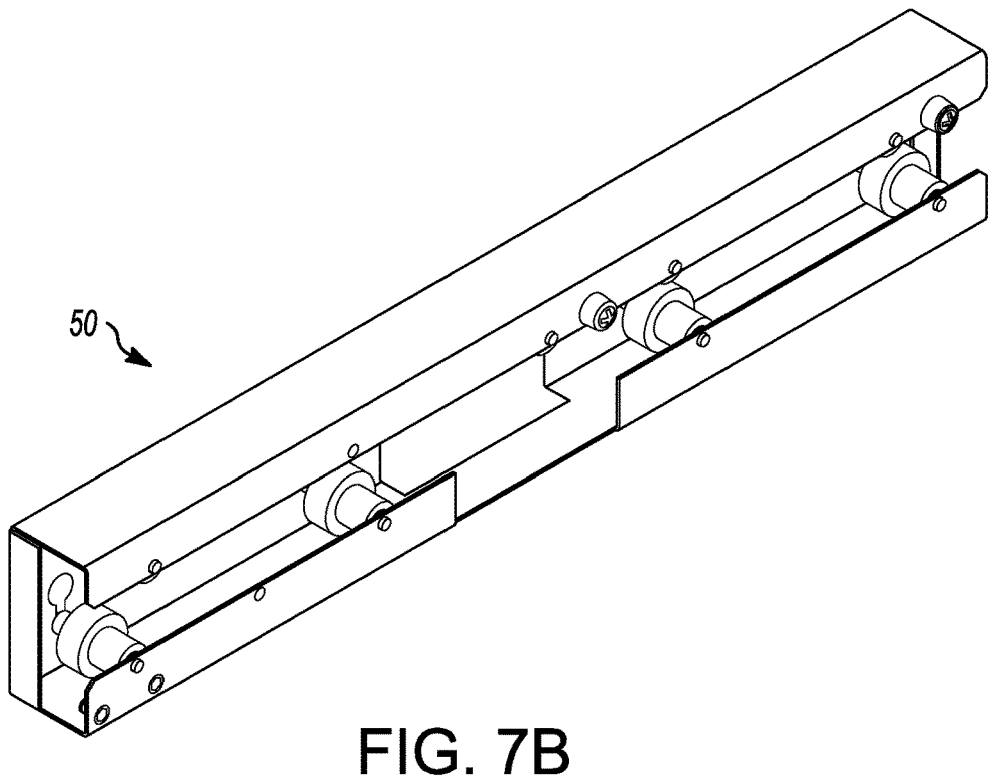
Figure 7C:
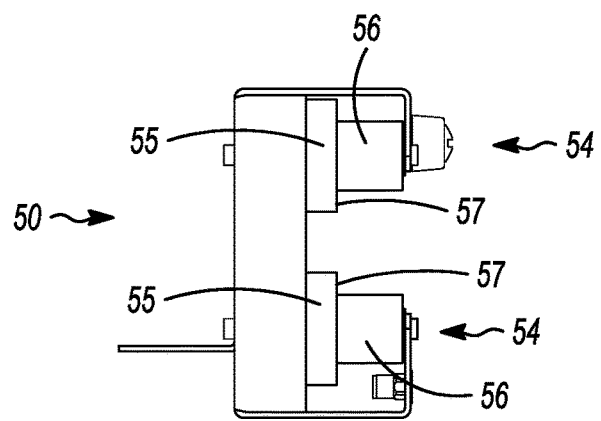

Referring now to FIGS. 7A-7C there is shown a left storage component track 50 (the right storage component track being the mirror image thereof). In this alternative, there are a pair of a plurality of longitudinally spaced apart rollers 53 one pair running along the lower portion of the storage component track 50 and one pair running along the upper portion of the storage component track 50. The pair of a plurality of longitudinally spaced apart rollers also being vertically spaced from each other. The storage component track has a C-channel profile such that each end of the rollers that form each of the pair of spaced part rollers are rotationally secured on the back and the front of storage component portion forming the C-channel thereof (See FIG. 7C). Referring now to FIG. 7C, there is depicted an upper and lower roller 54, wherein each roller has a first large diameter 55 and a second smaller diameter 56, the contact point between the first large diameter and second smaller diameter forming a roller wall 57. Roller wall 57 mitigating unwanted lateral movement of storage component when moving along the storage component tracks 50.

Figure 8A:
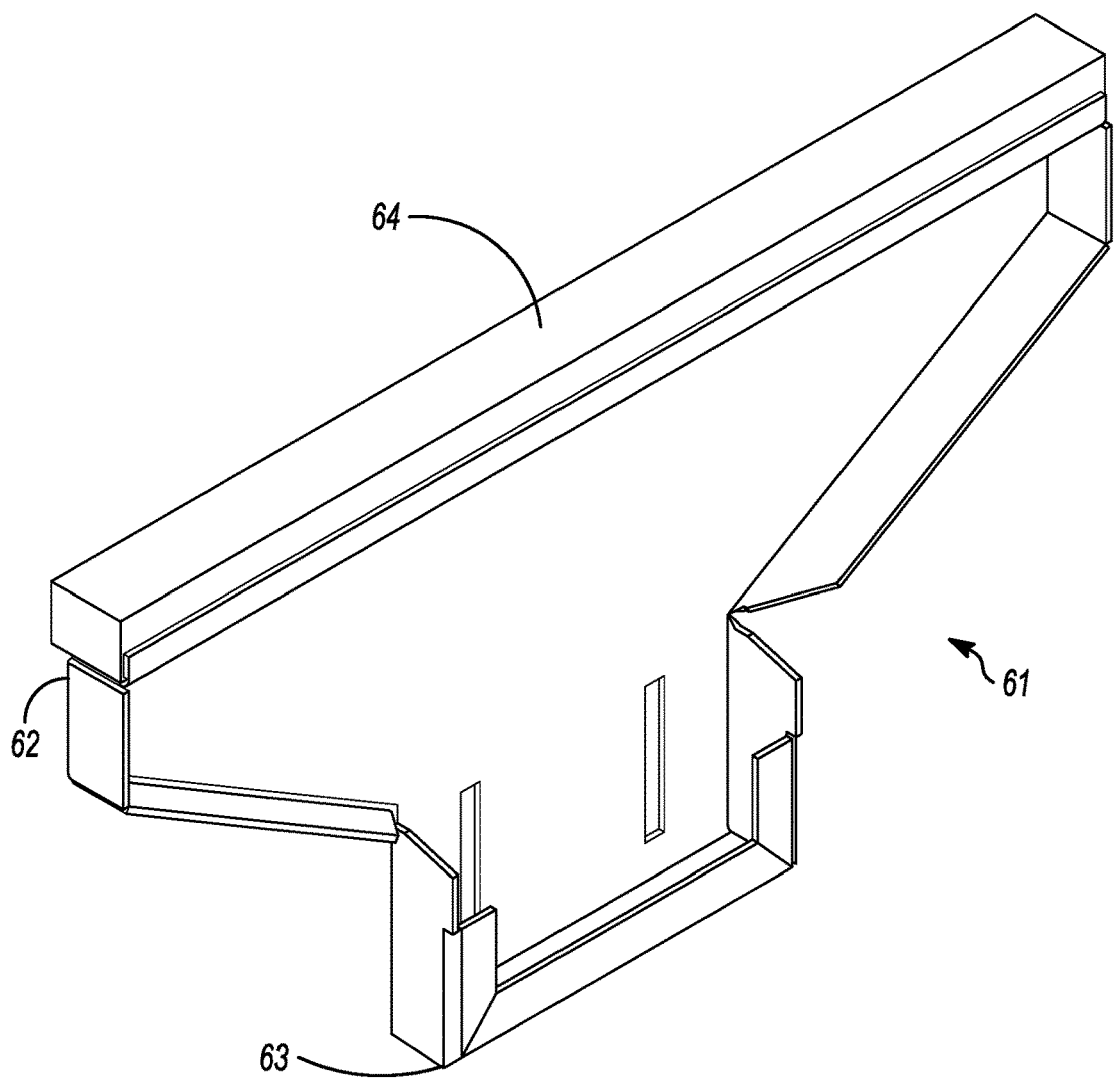
FIG. 8A is a perspective view of the compression member, according to one alternative.
Figure 8B:
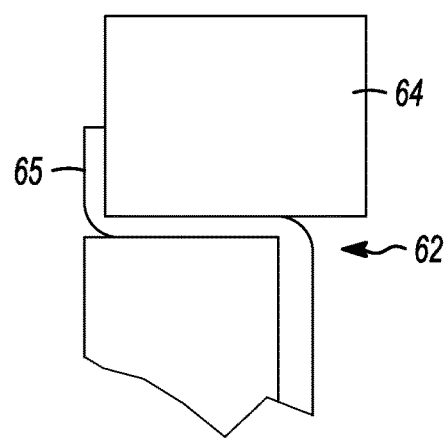
FIG. 8B is a magnified view of the resilient portion of the compression member of FIG. 8A.

Referring now to FIG. 8A, there is depicted compression member 61 having a top 62 and a bottom 63. The top 62 being longer than the bottom 63, in the shape of a "whale's tail". The longer top providing more surface contact with the inside top corner of a truck bed side wall. Running along the top 62 of the compression member 61 is a resilient portion 64. In this alternative, resilient portion 64 has a rectangle cross section. Resilient portion 64 sits on the top 62 and top wall 65. In this alternative, resilient portion is secured thereon by any suitable adhesive compatible with joining of the materials of the resilient portion 64 and top 62 and top wall 65. If the resilient portion is rubber and the top and top wall is metal, contact cement may be suitable adhesive. Bottom 63 is shaped to fit in the C-channel as seen in FIG. 6.

Figure 9A:
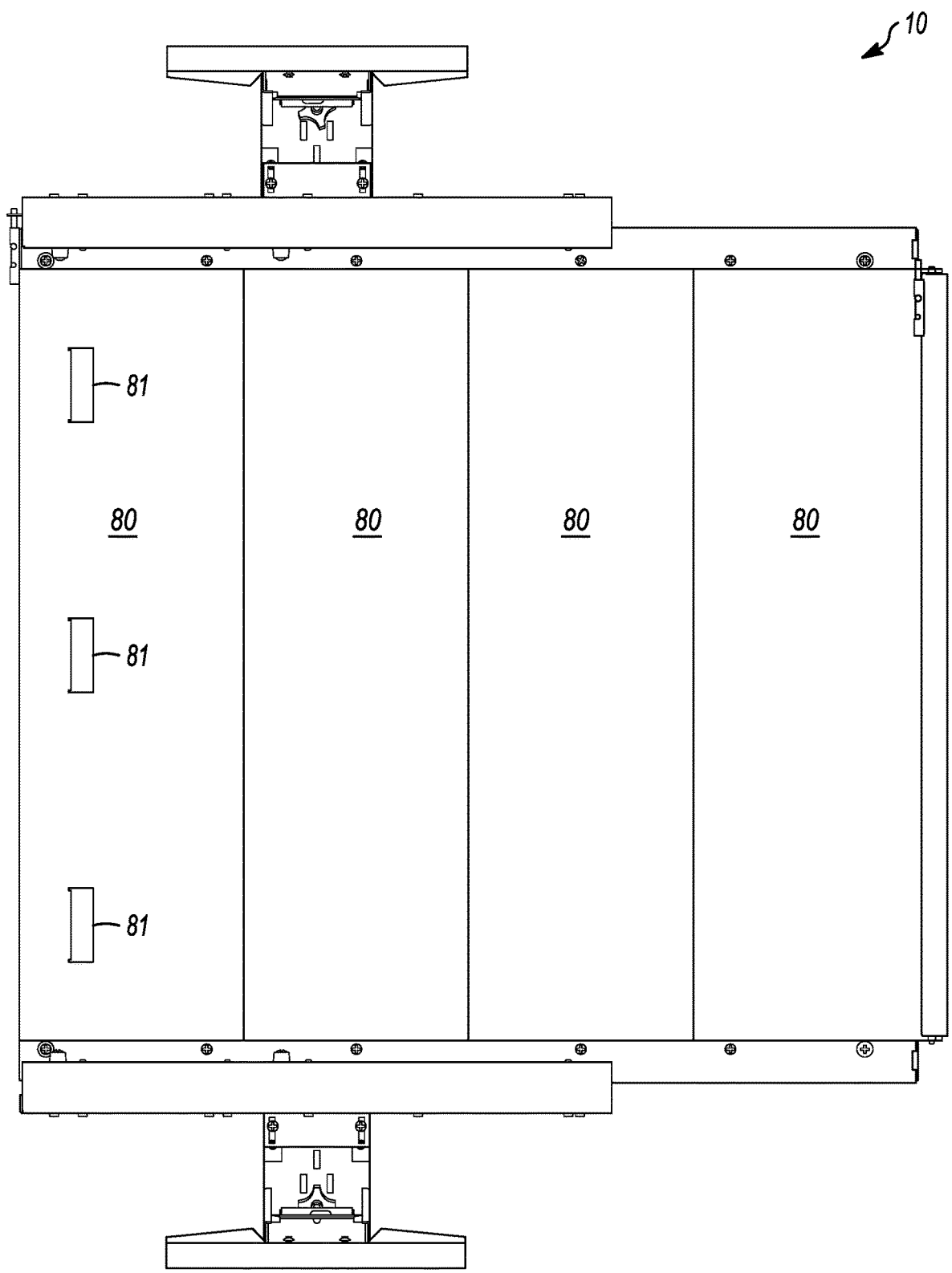
FIG. 9A is a top view of the modular light weight universal non-invasive retractable storage system, according to one alternative.
Figure 9B:
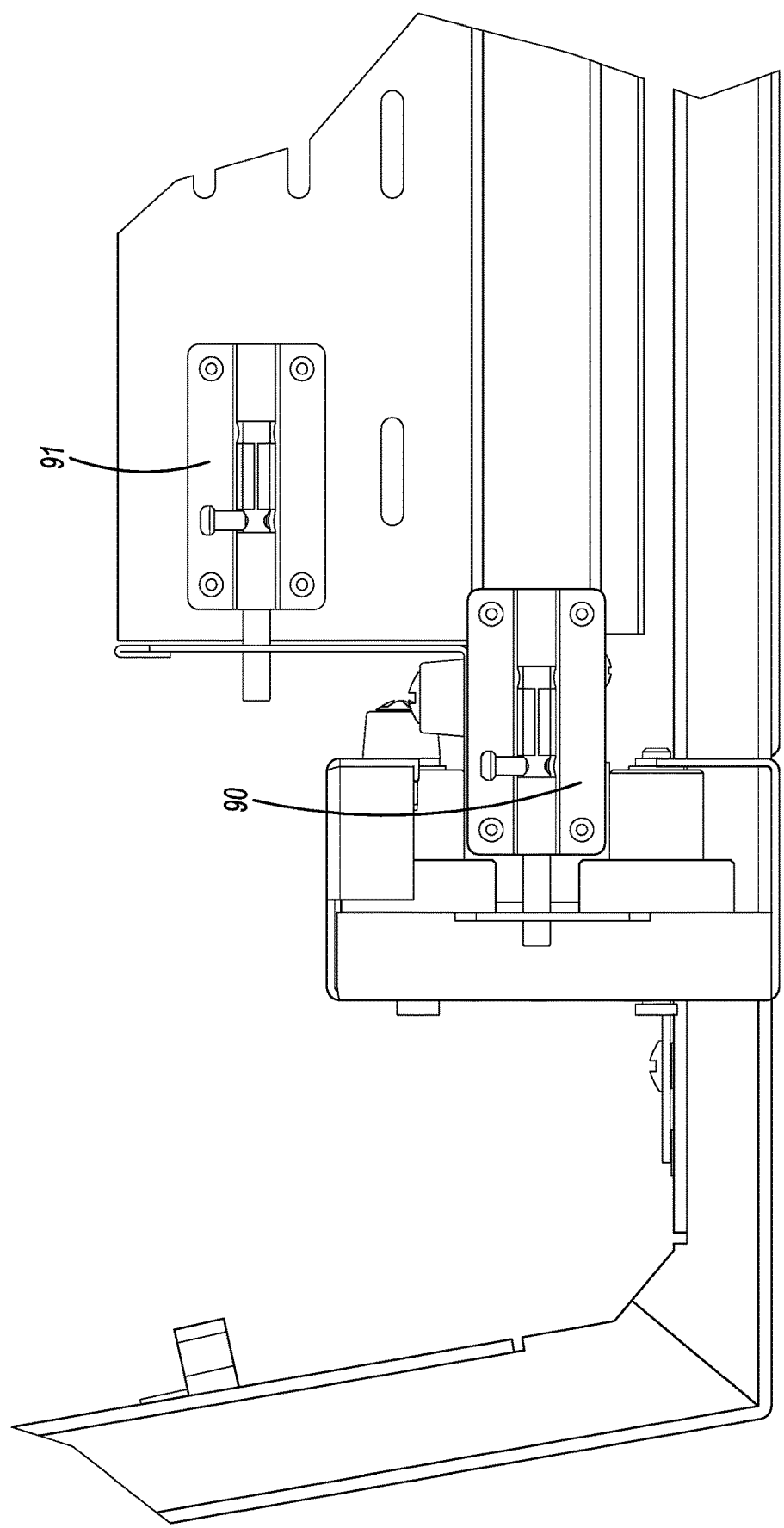
FIG. 9B is a magnified view of the locking mechanism, according to one alternative.

Referring now to FIG. 9A, there is depicted a top view of the system 10 with four storage component panels 80 joined to each other forming a storage component bottom. Storage component panel 80 near the tail gate of the truck bed has a series of three laterally spaced apart gripping apertures 81 to facilitate movement of the storage component along the storage component tracks. FIG. 9B depicts a latch barrel slide bolt 90 as a locking mechanism to lock the storage component from movement along the storage component tracks 50. FIG. 9B also depicts a second latch barrel slide bolt 91 for latching the back panel in place forming the storage component.

Figure 10:
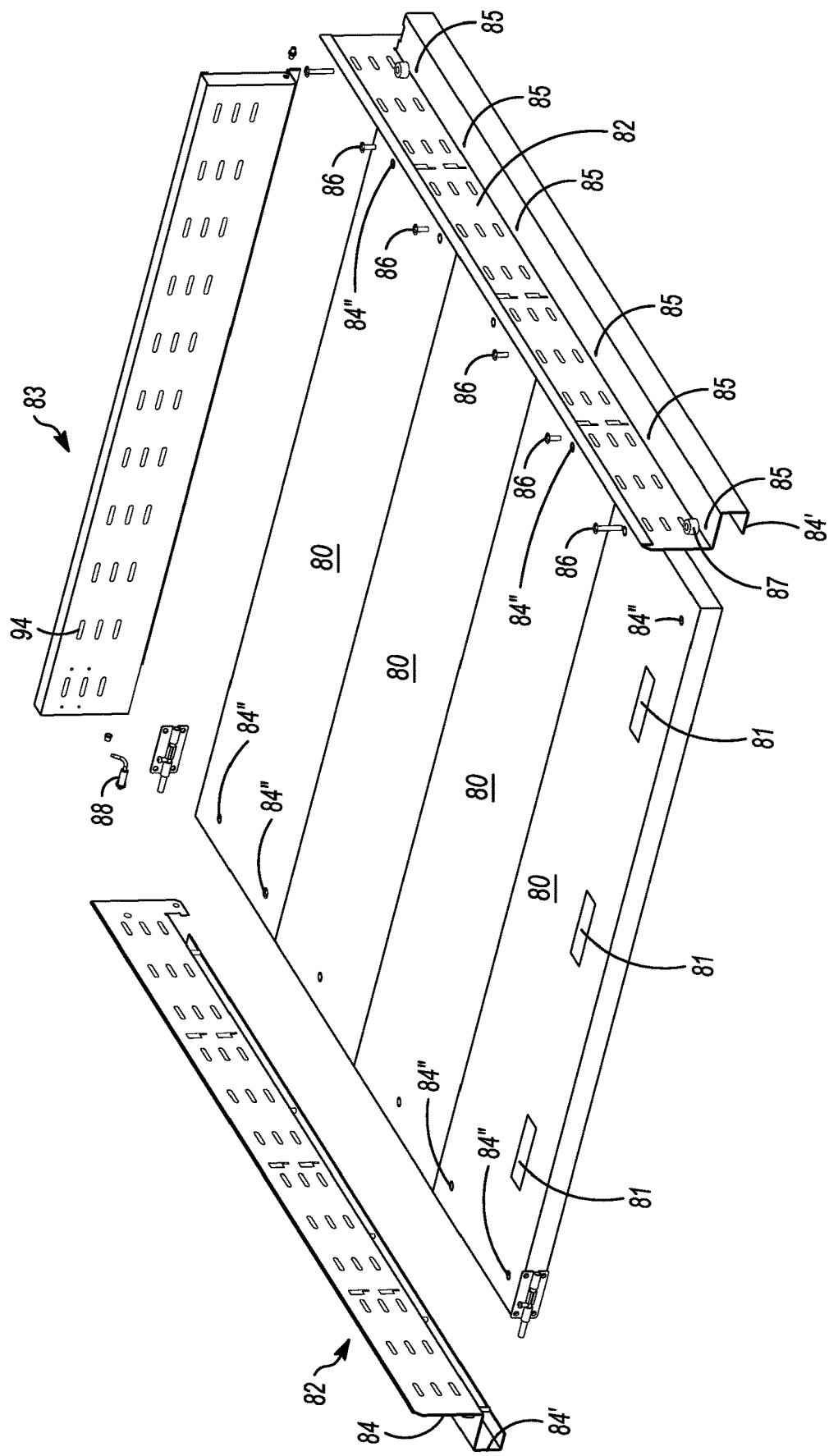
FIG. 10 is an exploded view of the storage component, according to one alternative.

Referring now to FIG. 10, there is depicted an exploded view of the storage component with the bottom panels 80 and gripping apertures 81. Storage component side walls 82 are depicted as is storage component back wall 83. Storage component side walls 82 comprise a vertical wall 84" and a C-channel 84' running along the lower portion of the vertical wall. The C-channel serving to receive the ends of each bottom panel 80 and allowing for securement of the bottom panels 80 with each other and with the side walls 82. In this alternative, tow bottom panels 80 have two spaced apart fastener holes 84 on each end thereof which match up with spaced apart fastener holes 85 on the top of C-channel of each vertical wall 83. And the two middle bottom panels have one fastener hole on each end thereof. When the bottom panels are arranged as desired and secured in place in the C-channel of the vertical wall, and spaced apart fastener holes 84 and 85 are aligned, fasteners 86, such as screws, may be used to secure the bottom panels 80 to the side walls 82. Back wall 83 is rotationally secured to side walls 82 with a rotational connector 89 (see FIG. 11), in this case a hinge pin at each end thereof and connected to the side wall, to allow for the back wall 83 to be in an upright locked position or in a flat open position if an item longer than the storage component system needs to be stored in the truck bed. To maintain back wall 83 in a locked upright position, locking mechanism 88 (See also FIG. 11), in this case spring hinge pin, is used to lock the back wall 83 in an upright position to the side walls. At each end of the side walls 82 is a rubber bumper 87 for to engage with bumpers on the component track (SEE OTHER FIGURES). Along the back wall 83 and side walls 82, there are a plurality of load securement receivers 94 to receive load securing devices, such as bungee cord or tie downs, in order to keep the load secured. In this alternative, each load securement receiver is an elongated slot to receive an end of a bungee cord or tie down. In this alternative, there are a plurality of horizontally and vertically spaced apart load securement receivers to accommodate various loads and various securing devices.

Figure 11:
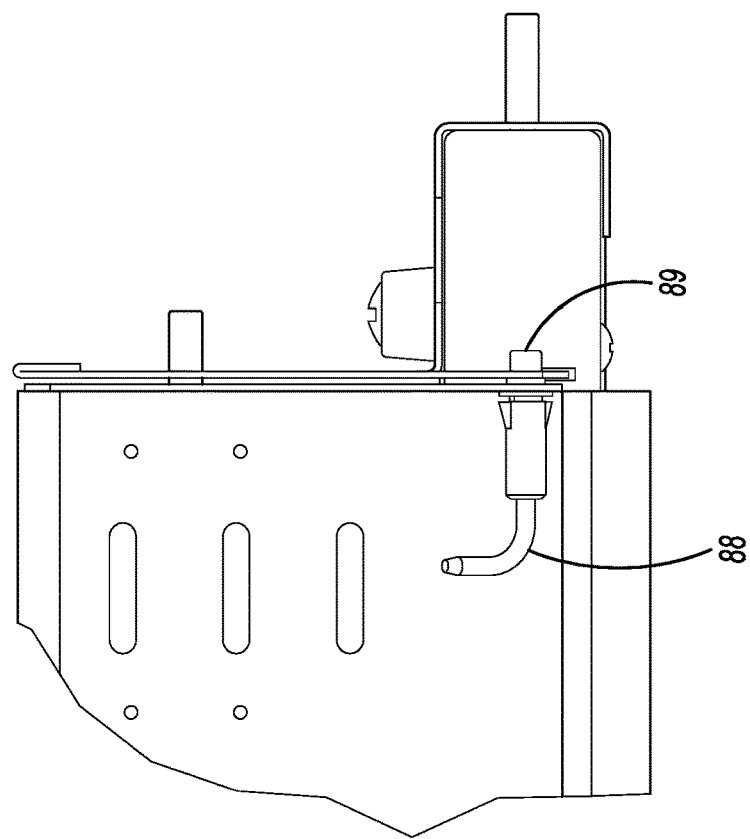
FIG. 11 is an exploded breakaway view of the bumpers and spring hinge pin, according to one alternative.
Figure 11:
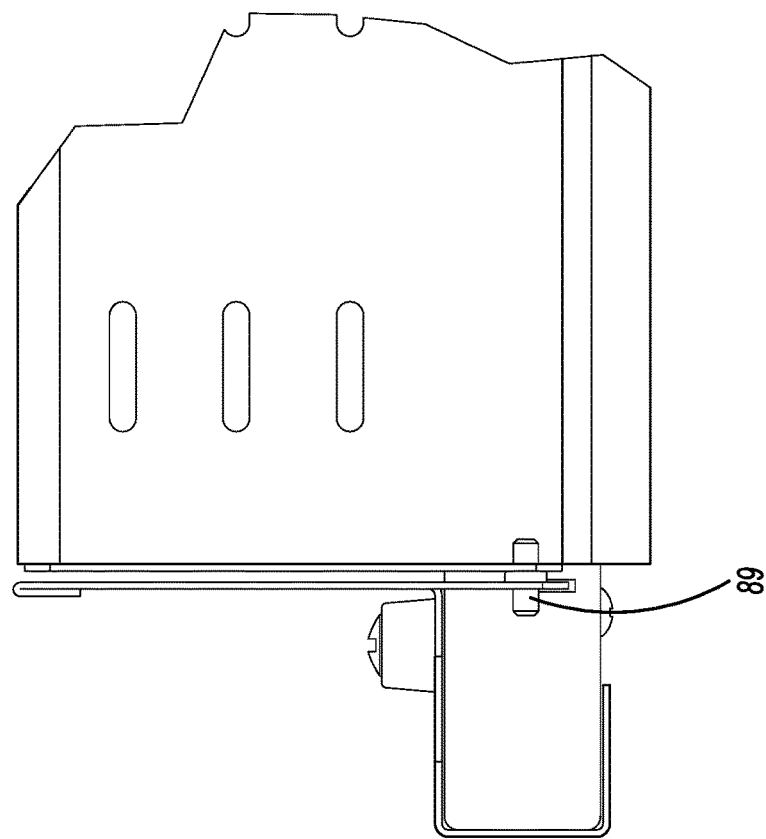

Referring now to FIG. 11, there is depicted an exploded view of the back wall 83, showing each end thereof. On the left there is seen the hinge pin and rubber bumper 87. On the right there is seen a hinge pin and rubber bumper 87 and a spring hinge pin.

Figure 12:
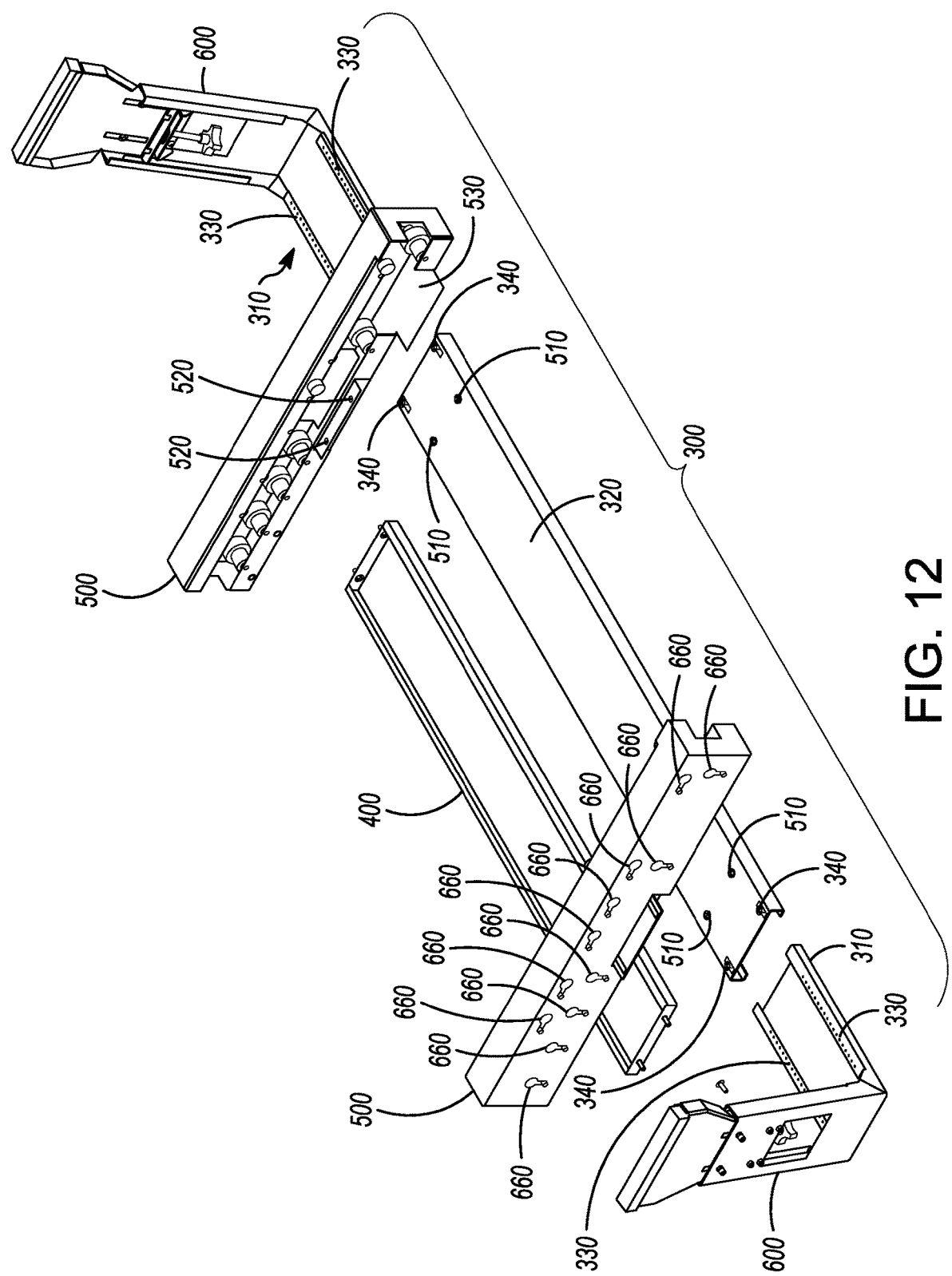
FIG. 12 is an exploded view of an alternative of a modular light weight universal non-invasive retractable storage system.
Figure 12A:
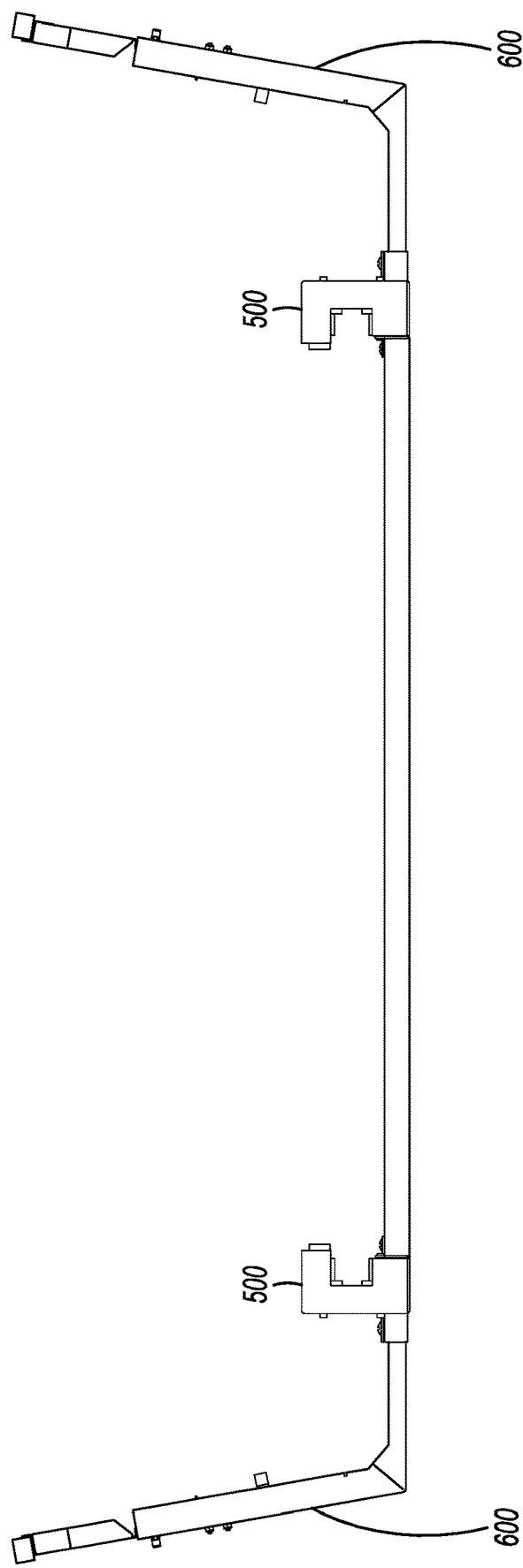
FIG. 12A is a front view of the alternative of FIG. 12.

Referring now to FIG. 12, there is depicted an exploded view of an alternative to the retractable storage system depicted in FIGS. 4A, 4B and 5. In this alternative, the length adjustable transverse frame member 300 comprises two male members 310 and one centrally located female member 320. Each of the two male members 310 sliding into the centrally located female member 320. Each of the two male members 310 have a plurality of male member engagement apertures 330 running along each side thereof. When each of the two male members 310 are slid into the central female member 320, and the width between the vertically adjustable members 600 is determined, a selected pair of male member engagement apertures 330 are lined up with the complementary female member engagement apertures 340 and locked in place with a fastener (such as a screw or the like). Each of the left and right storage component tracks 500 are secured onto the female member 320 by lining up female member component track apertures 510 with complimentary component track female member apertures 520 (see also FIGS. 12A and 12B) making the left and right storage component tracks 500 a fixed distance apart from each other. Fixing the left and right storage component tracks 500 to a certain distance, only one storage component with a fixed width is needed, in order to accommodate trucks of various widths. In one alternative, the storage component has a length accommodating the length of the truck bed. In one example, the length is about 48 inches. In another alternative, the width of the storage component accommodates the distance between wheel wells of the truck bed. In one alternative, the width is about 46 inches. Second transverse member 400, in this alternative, is fixed in length. To accommodate trucks of various widths, second transverse member 400 may be made to the desired width. An example is provided below. As best seen in FIG. 12, each storage component track 500 further comprises a stability plate 530 extending normal to the length of each storage component track 500 and along the bottom of said track 500, to further stabilize and reduce any unwanted movement of the system on the bed of a truck by resting on the surface of the truck bed. Each of left and right storage track 500 further comprise on each respective outside wall, a plurality of roller receivers 660, to accommodate rollers. In this alternative, each cargo roller receiver 660 is keyhole shaped.

Figure 13B:
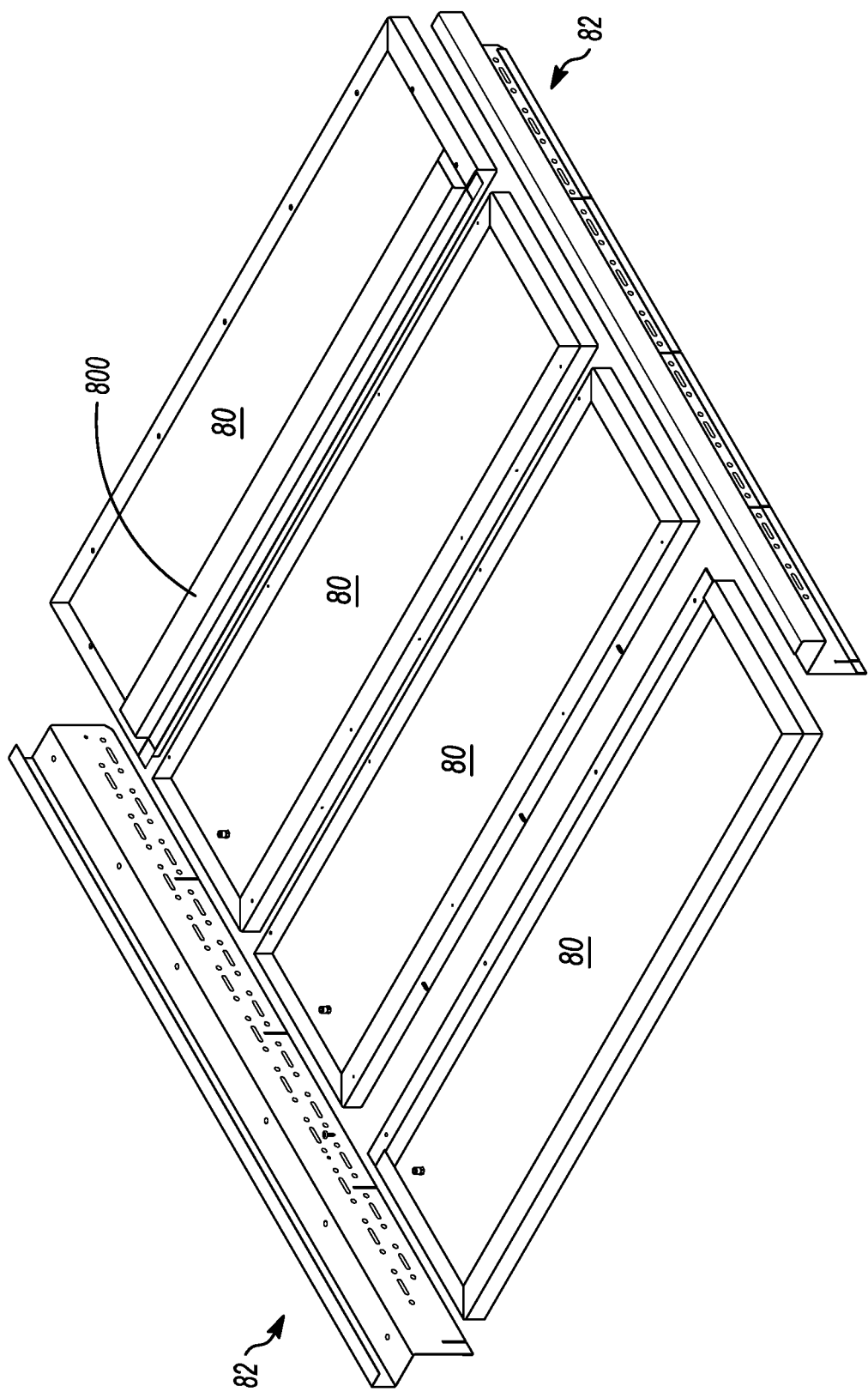
FIG. 13B is an exploded bottom view of the storage component of FIG. 13A.
Figure 13C:
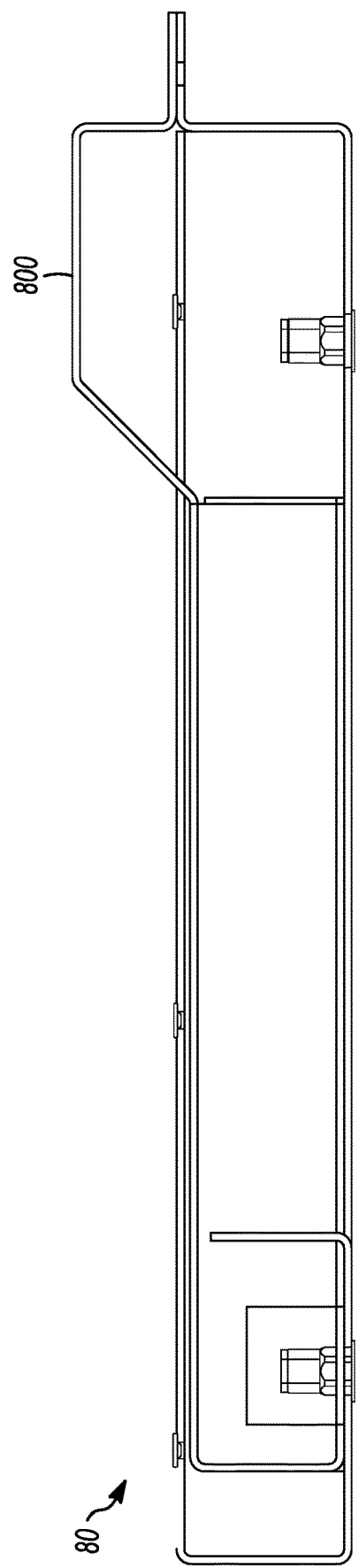
FIG. 13C is a cross-sectional view of a panel, according to one alternative.

Referring now to FIGS. 13A and 13B, there is depicted an exploded view of panels 80 from the top and from the bottom. Side walls 82 allow for the joining of the panels 80 to each other forming the storage component. Hand apertures 81 are found on the panel distant the truck cabin. From the bottom view, panel 80 with the hand apertures 81 further comprises rest bar 800, running the length of the panel 80. Rest bar 800 serves to engage the surface of the tail gate of a truck when opened mitigating any unwanted movement of the system within the truck bed. FIG. 13C provides a cross section of panel 80 with the rest bar 800.

Figure 14:
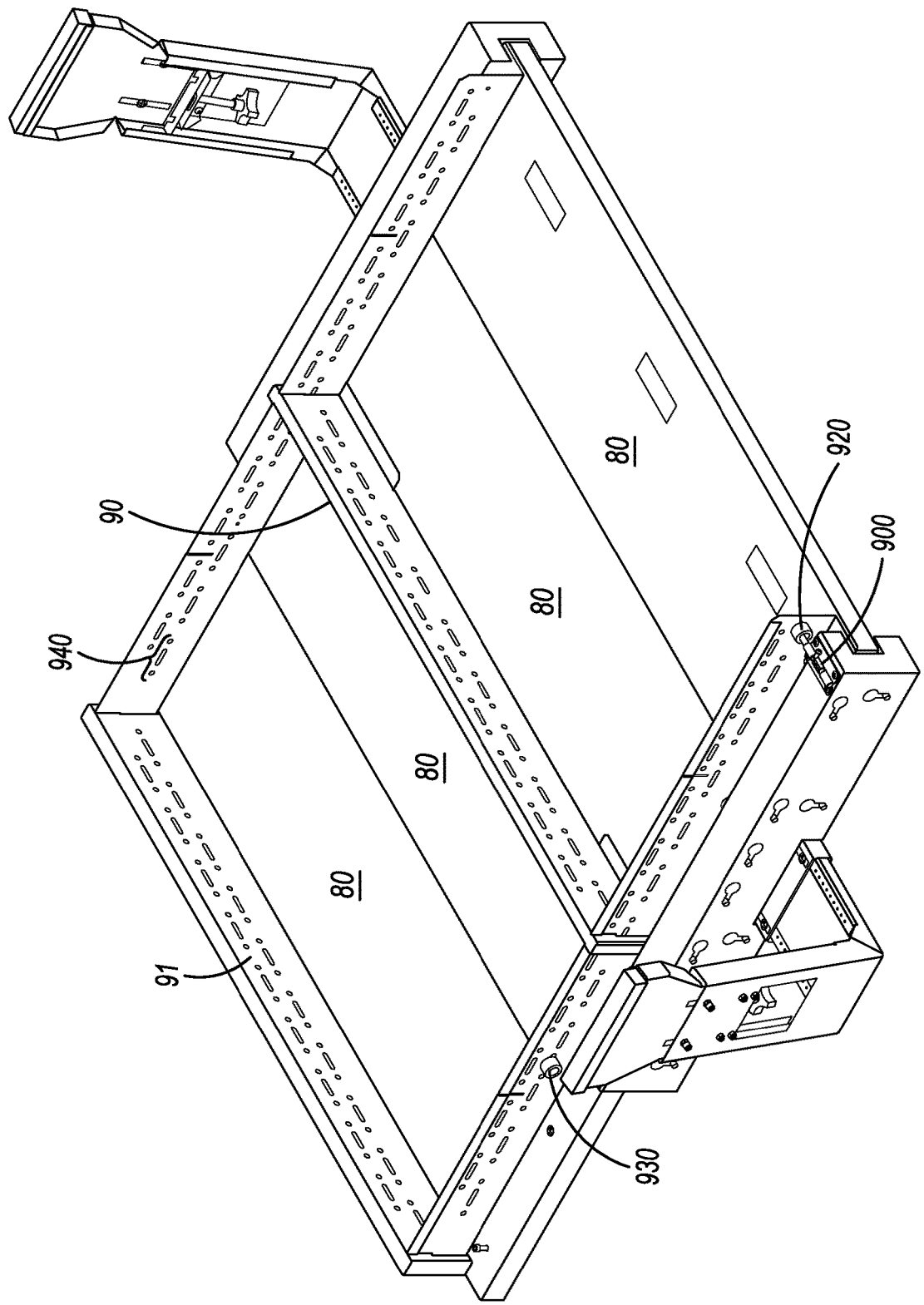
FIG. 14 is a perspective view of an alternative of a modular light weight universal non-invasive retractable storage system of FIG. 12.

Referring now to FIG. 14, there is depicted a removable interior transverse wall 90, which may be placed anywhere along the length of the system to accommodate creating isolated compartments along the panels 80. The interior transverse wall 90 engages the side walls through a series of apertures to lock the transverse wall 90 in place. Although only one transverse wall is depicted, more than one may be incorporated. Furthermore, longitudinal dividers may also be incorporated herein. Also a panel 80 locking mechanism 900, in this alternative a latch barrel slide bolt, which allows for locking the unit in place when retracted, by engaging with latch barrel slide bolt receiver 920, located at one end thereof, and locks the unit place when fully extended by engaging with latch barrel slide bolt receiver 930, located at the other end thereof. Along the back wall 91, interior transverse wall 90 and side walls, there are a plurality of load securement receivers 940 to receive load securing devices, such as bungee cord or tie downs, in order to keep the load secured. In this alternative, each load securement receiver 940 is an elongated slot and an aperture to receive an end of a bungee cord or tie down. In this alternative, the elongated slot receives an end of a bungee cord with the cord and hook portion passing through the elongated slot and the hook portion of the bungee cord is secured in place by inserting the hook portion in the aperture next to the elongated slot. In this alternative, there are a plurality of horizontally and vertically spaced apart load securement receivers 940 to accommodate various loads and various securing devices. In one alternative, back wall 91 is removable.

Figure 15:
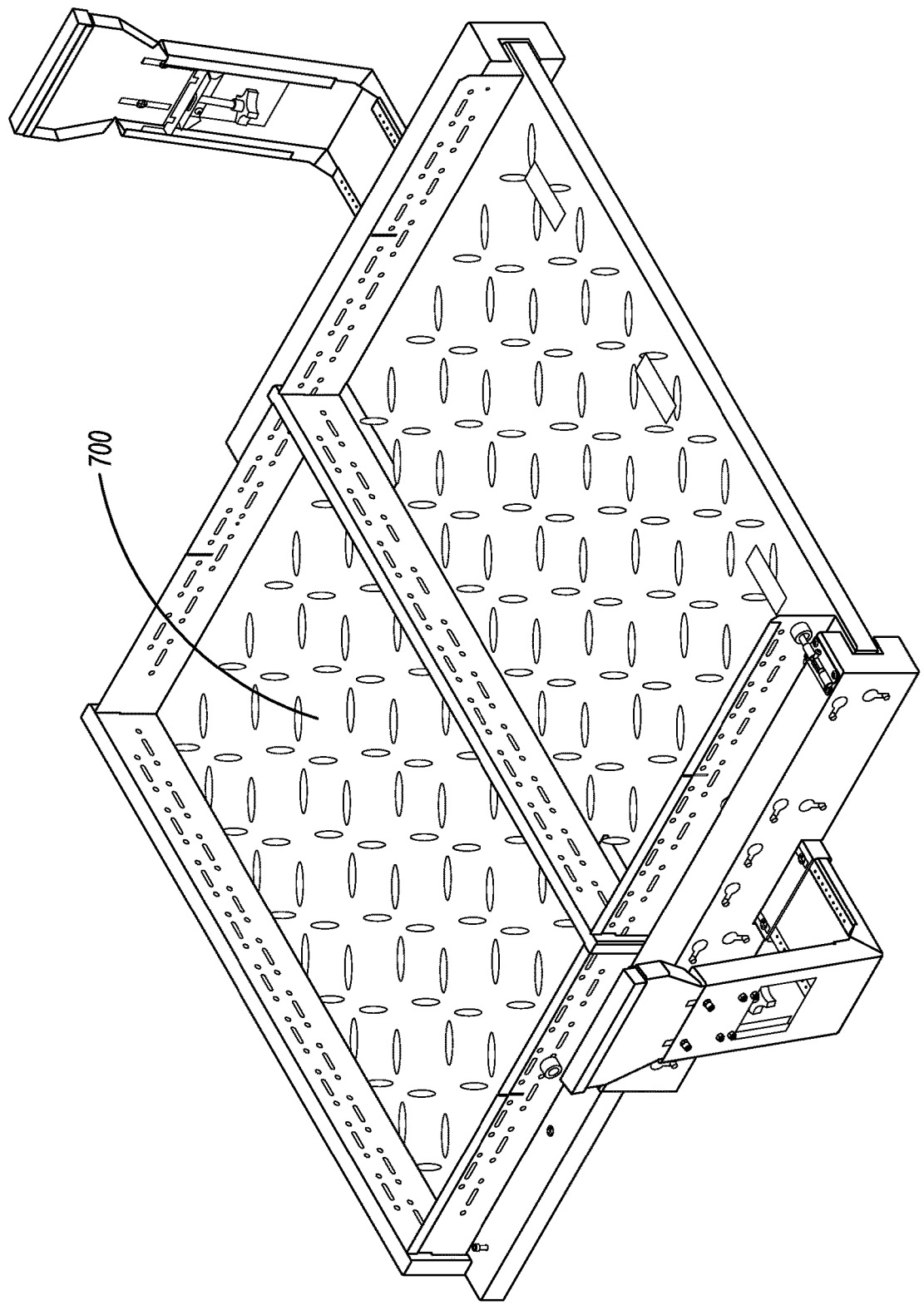
FIG. 15 is a perspective view of an alternative of a modular light weight universal non-invasive retractable storage system with a mat.

Referring now to FIG. 15, there is depicted a fitted mat 700 which sits on top of said panels. Said mat 700 serves to protect the panel surface from damage (such as scratches, liquid spills, etc.). In one alternative, said mat includes a textured side and a non-textured side. Said mat may be used on either side based on i) preference (textured vs non-textured side for items to move across with more ease. Said mat may be flipped over in the event there is a spill of a liquid and one wants to contain said spill. In one alternative, said fitted mat is of a flexible material to accommodate transportation and versatility. In one alternative, said flexible material is rubber-like.

Figure 12B:
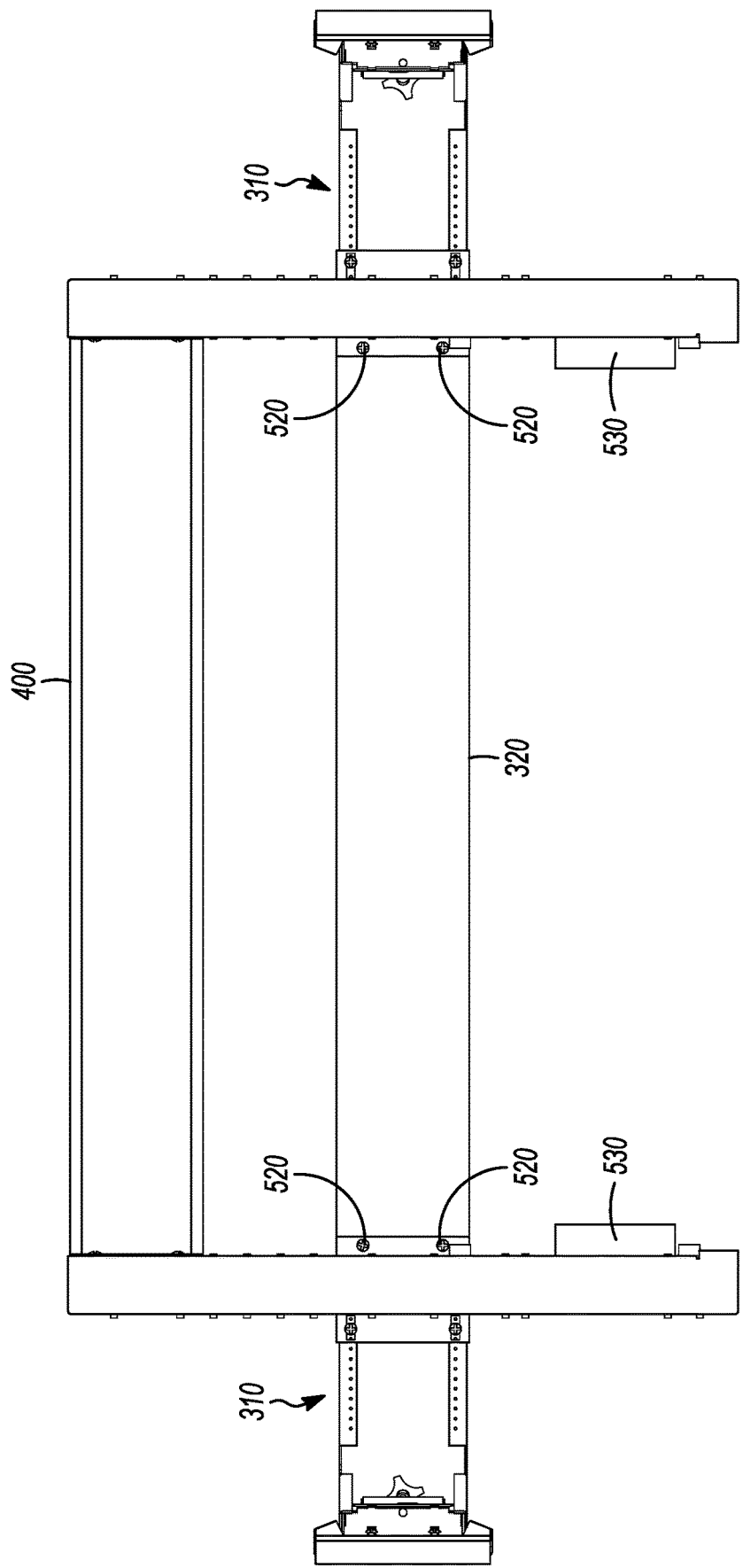
FIG. 12B is a top view of the alternative of FIG. 12.
Figure 16:
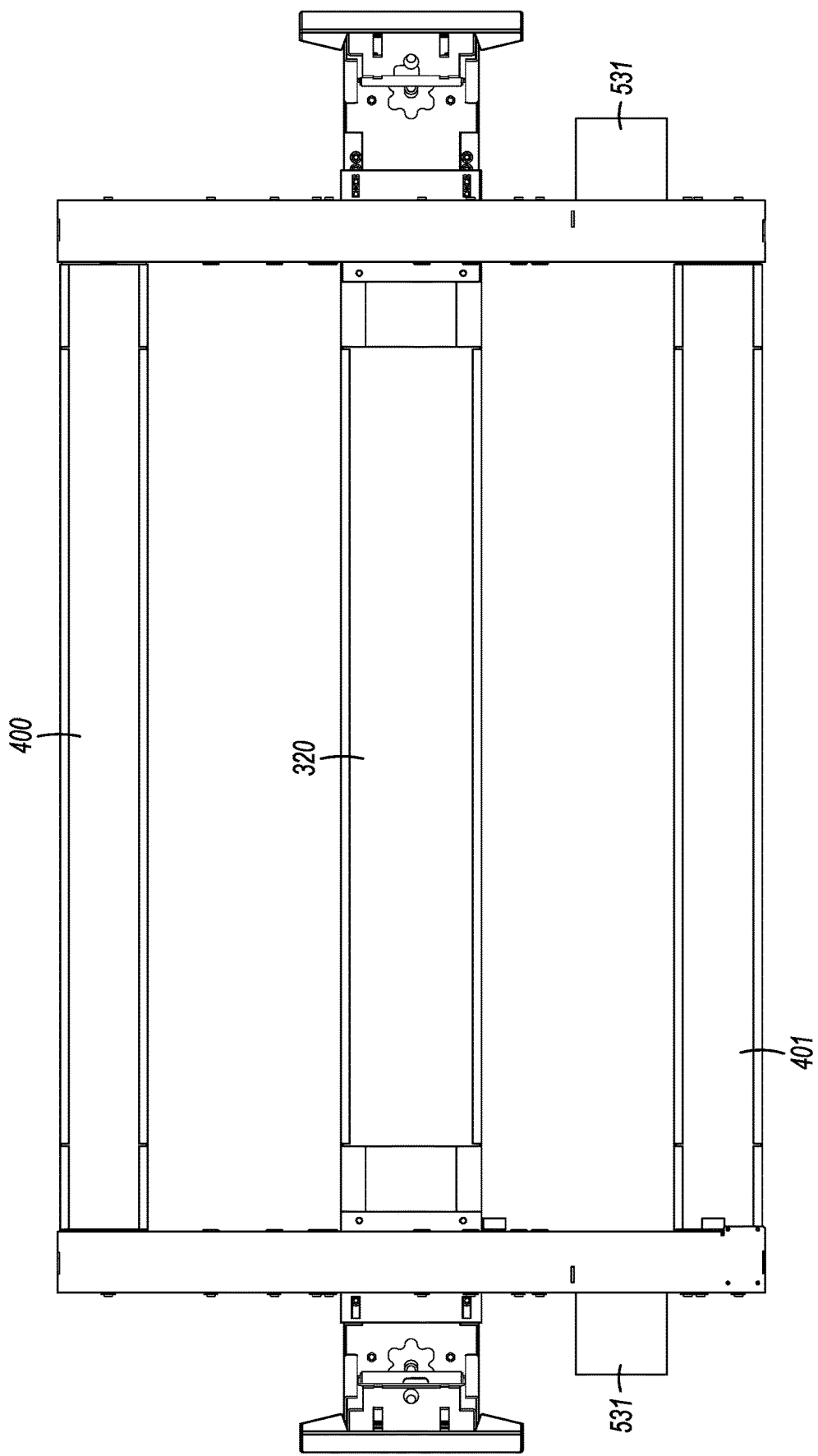
FIG. 16 is an alternative of FIG. 12B depicting an additional transverse member 401 and stability plates 531 in a different location.

Referring now to FIG. 16, there is depicted an alternative to FIG. 12B depicting an additional transverse member 401, transverse member 400, centrally located female member 320 and stability plates 531 on the outside of the frame to provide further stability to the frame when in a truck bed.

Figure 17A:
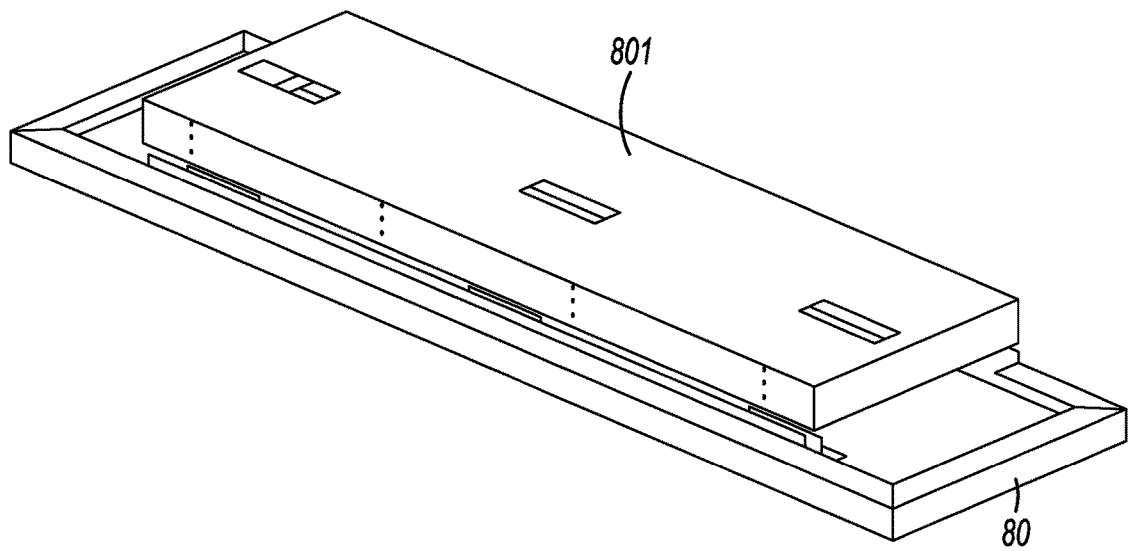
FIGS. 17A, 17B and 17C provide a view of the height adjustable spacer to accommodate various tailgate configurations.
Figure 17B:
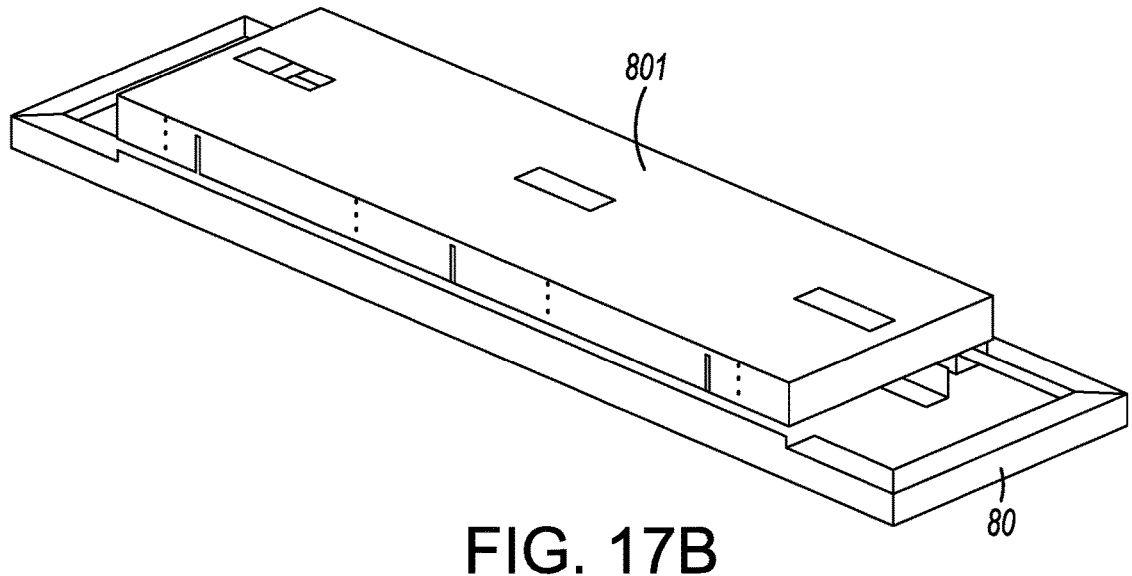
Figure 17C:
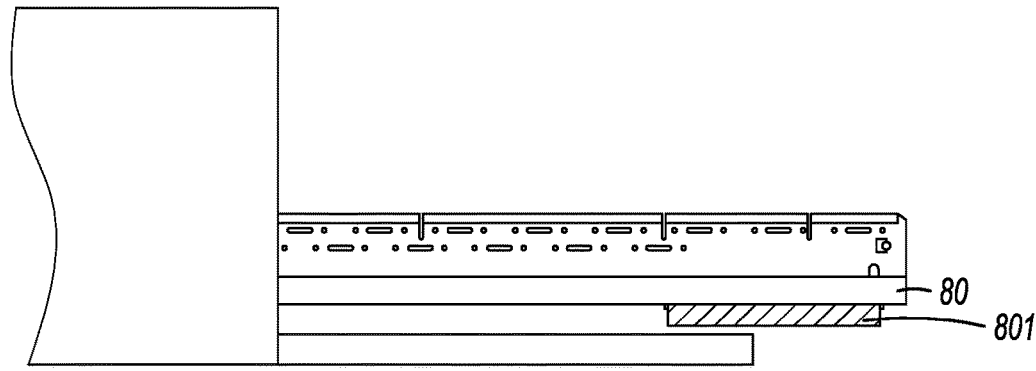

Referring now to FIGS. 17A-17C, height adjustable spacer 801 is shown as being adjustable in relation to the tailgate of a truck bed in order to accommodate various tailgate configurations. Height adjustable spacer 801 includes a series of spaced apart apertures to accommodate fasteners, such as screws. The height of the height adjustable spacer 801 will be determined by the selection of aperture for the fasteners, to fasten onto panel 80.

Figure 18A:
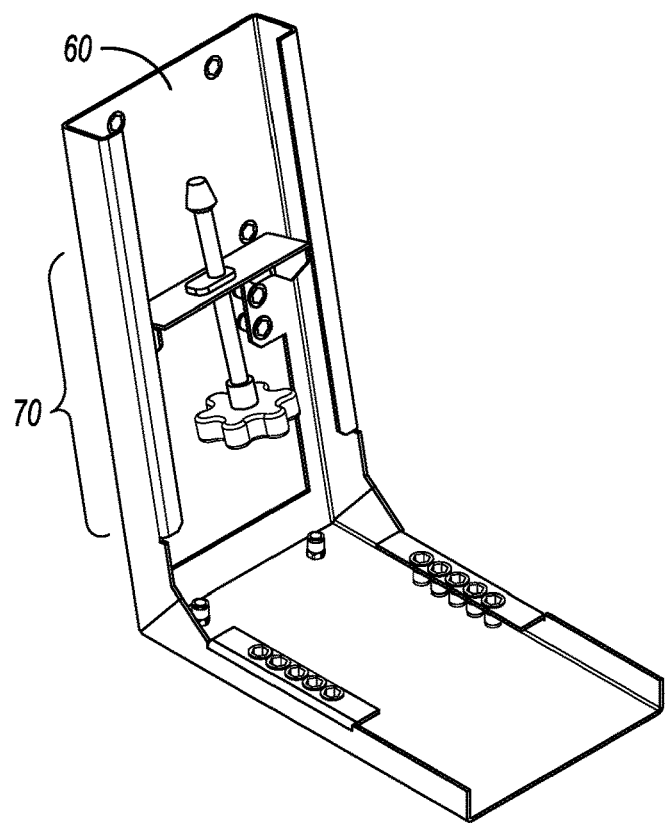
FIGS. 18A, 18B and 18C depict the member tensioner 70 being adjustable along vertical member 60.
Figure 18B:
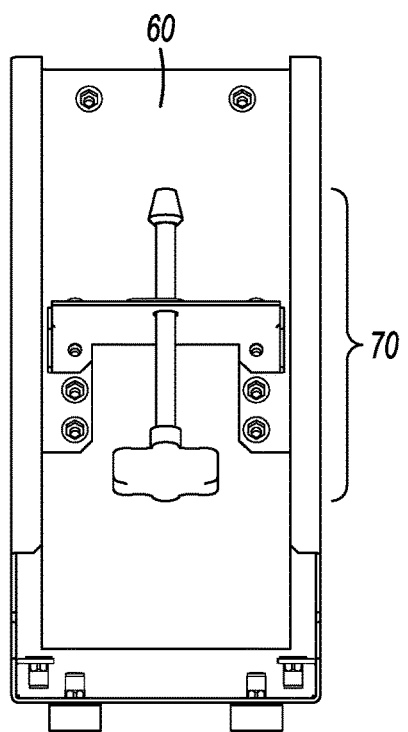
Figure 18C:
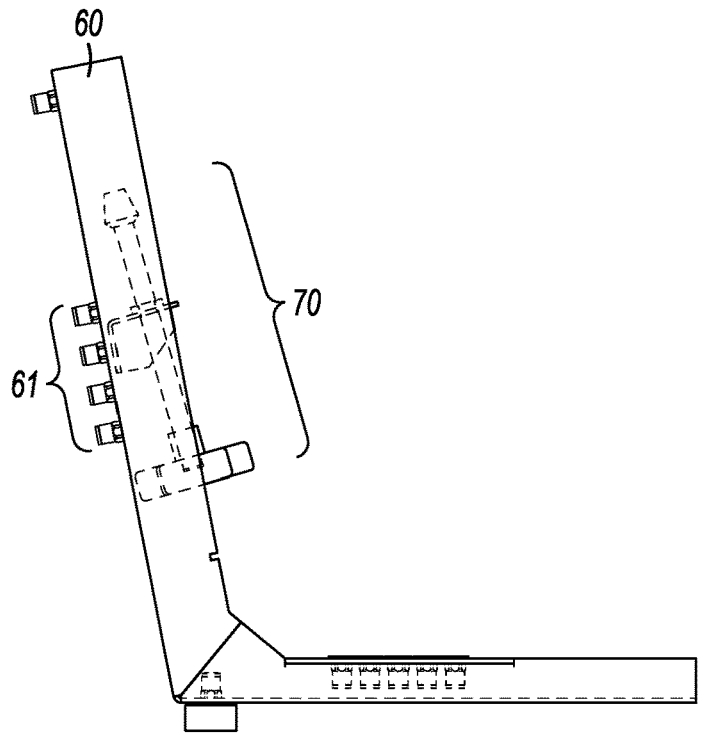

Referring now to FIGS. 18A-18C, there is depicted member tensioner 70 being adjustable along the length of vertical member 60. In this alternative, vertical member 60 includes a number of length location apertures 61 such that the member tensioner 70 may be located along the length of the vertical member 60, at a desired location to accommodate various truck bed configurations.

Figure 19A:
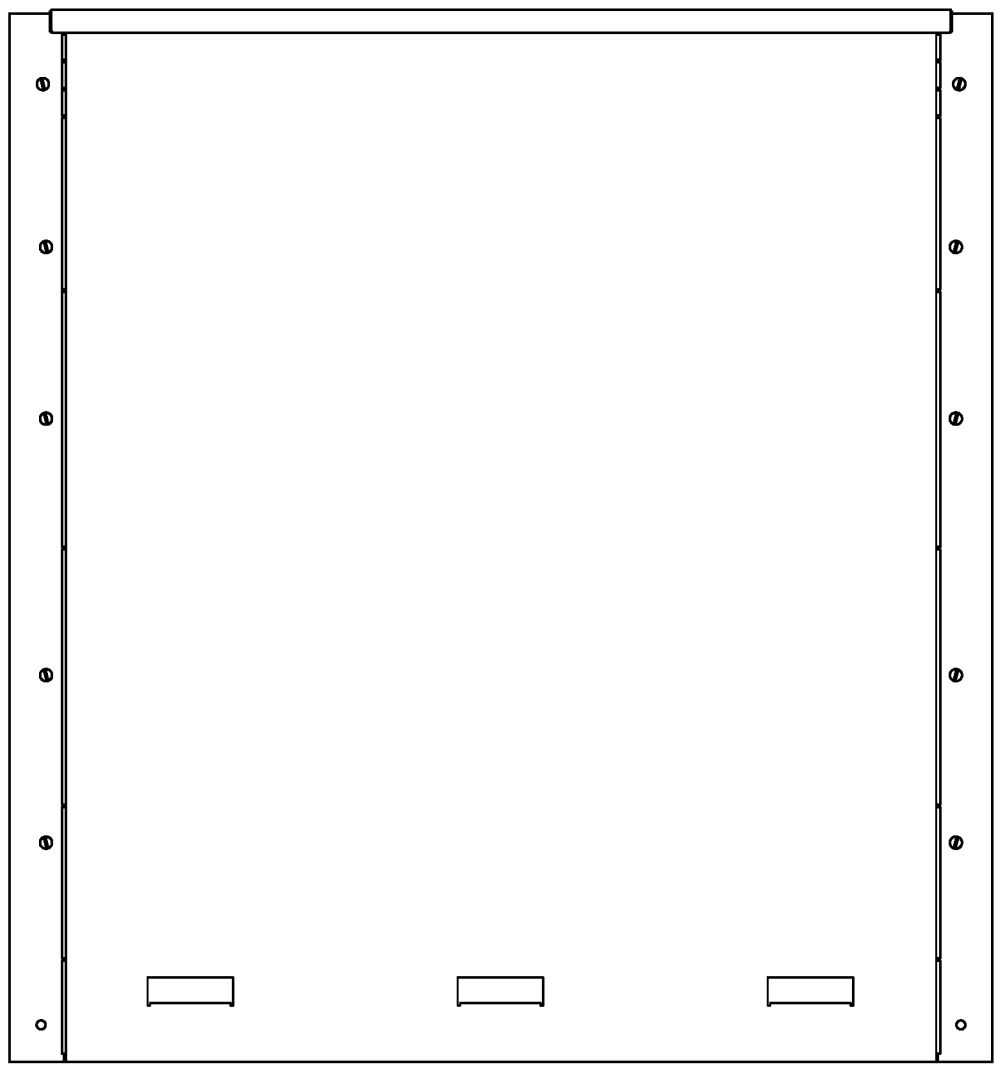
FIGS. 19A-19D depict the storage system having one panel to five panels.
Figure 19B:
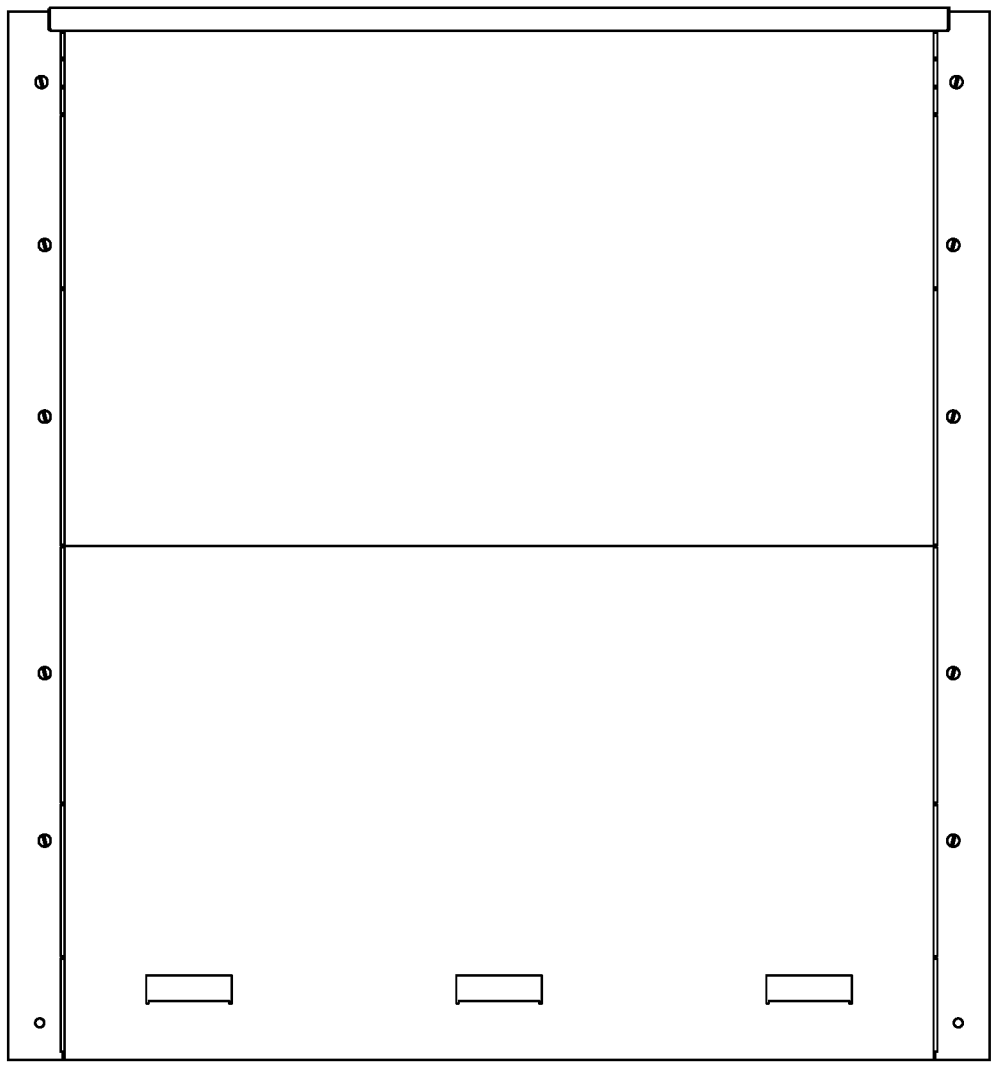
Figure 19C:
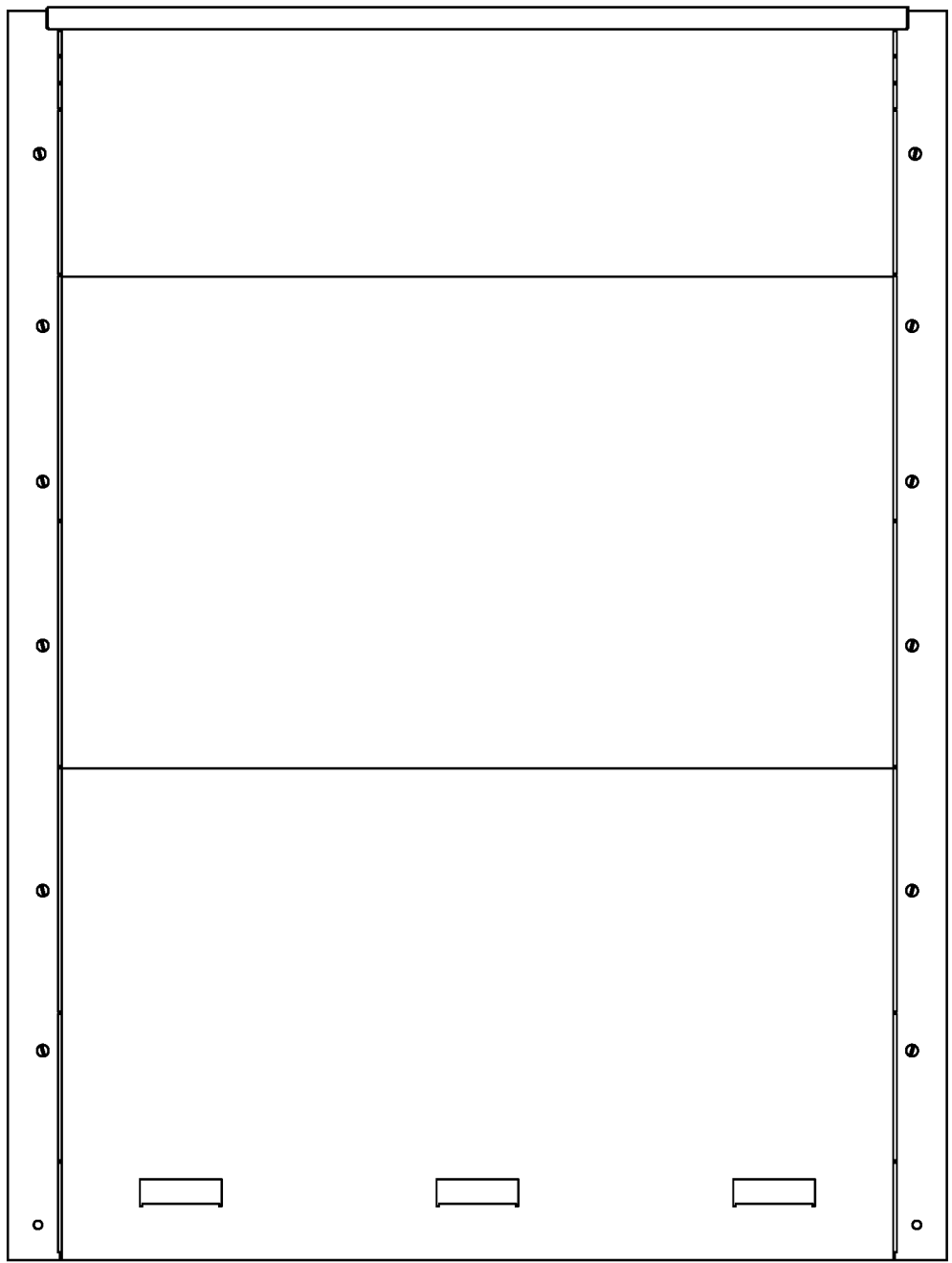
Figure 19D:
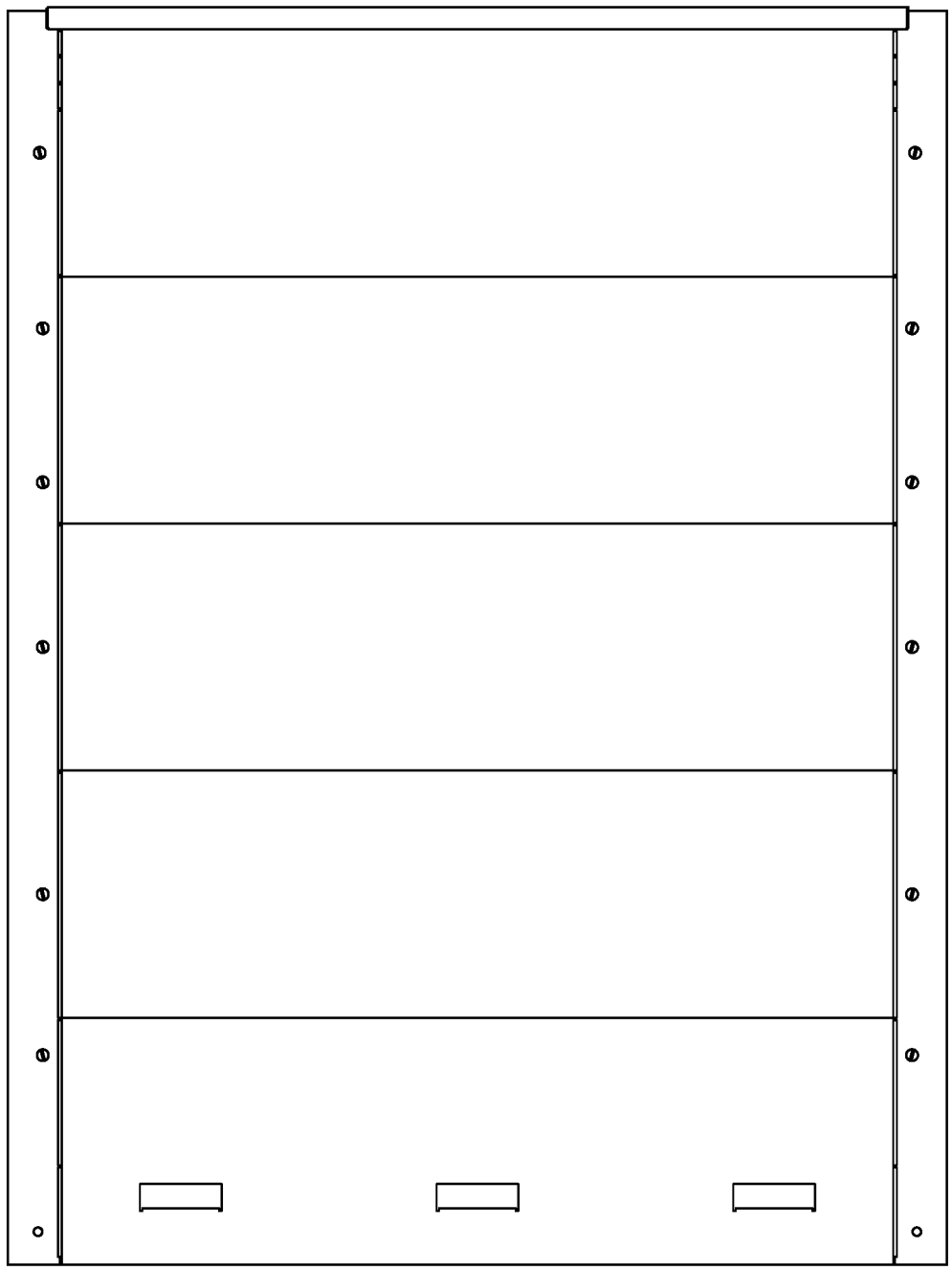

Referring now to FIGS. 19A-19D, there is depicted the storage system with panels ranging from one panel FIG. 19A, two panels FIG. 19B, three panels FIG. 19C and five panels FIG. 19D. However, the number of panels may be determined by the environment of use.

The following is one alternative to assemble and install the alternative depicted in FIGS. 12-19:

i) in truck bed, assemble the frame component comprising:
  a. lay out a left transverse male member near the left side of the truck bed and lay out a right transverse male member near the right side of the truck bed, transversely aligning the left and right transverse members end to end with each other;
  b. overlay the transverse female member on top of the left and right transverse male members and secure with screws in predefined holes;
  c. align left and right storage compartment tracks onto the transverse female member and secure with screws in predefined holes;
  d. Insert each compression member into the respective vertical member;
  e. adjust left and right transverse member so that each respective vertical member is aligned for compression under side rail of truck
  f. extend each compression member to make contact with inner corner of truck bed side wall and top lip;
  g. tighten compression member with screws;
  h. insert storage component panels;
  i. move storage component forward until front extends past storage component track;
  j. install front and rear resilient bumpers;
  k. retract tray—engage lock out.

The following is one example of typical dimensions of pickup truck beds.

Truck Bed Dimensions:
Bed Width: (2018/19 Specs)

| Manufacturer | Between Wheel Wells Metal-Metal/With Vinyl bedliner | |
| --- | --- | --- |
| | Full Size | Mid-size |
| Dodge RAM | 52"/50" | N/A |
| Ford | 51"/49" | 42"/40" |
| GMC/Chevrolet | 52"/50" | 44"/42" |
| Lowest common distance estimated with Vinyl liner | 49" | 40" |

Bed Length: (2018/19 Specs)

| | Full Size | | Mid Size | |
| --- | --- | --- | --- | --- |
| Manufacturer | Short | Regular | Short Box | Regular |
| Dodge RAM | 67" | 76" | currently not available | currently not available |
| Ford | 67" | 79" | 60" | 72" |
| GMC/Chevrolet | 70" | 79" | 62" | 74" |

For the above, the following is an option: for a full size truck: panel width=45.8" and the fixed female transverse member=44.5".

For a mid-size truck: panel width=37.4" and fixed female transverse member=36.3".

As many changes can be made to the preferred embodiment of the invention without departing from the scope thereof; it is intended that all matter contained herein be considered illustrative of the invention and not in a limiting sense.

The invention claimed is:

1. A modular universal non-invasive retractable/extendable storage system for a bed of a vehicle, said system comprising:
  a. a storage component and
  b. a frame component fit on the bed of said vehicle; said frame component for supporting said storage component;
  said frame component further comprising at least one length adjustable transverse frame member and at least two spaced apart longitudinal frame members connected normal to said at least one length adjustable transverse frame member;
  said at least one length adjustable transverse frame member further comprising a length adjustable vertical frame member at each end thereof, each of said length adjustable vertical frame member comprising a compression zone for a compression fit of said frame component on the bed of said vehicle without the need of piercing said bed of said vehicle;

each of said at least two spaced apart longitudinal frame members further comprising a storage component track for receiving a side of said storage component and for movement of said storage component in a horizontal plane from a first longitudinally retracted position to a second longitudinally extended position in relation to said bed of said vehicle.

2. The modular universal non-invasive retractable/extendable storage system of claim 1, wherein each of said length adjustable vertical frame member forms an angle in relation to said at least one length adjustable transverse member of greater than 90 degrees to about 105 degrees towards a side of said bed of said vehicle.

3. The modular universal non-invasive retractable/extendable storage system of claim 1, wherein said at least one length adjustable transverse frame member further comprises a locking component to lock said at least one length adjustable frame member to a desired length.

4. The modular universal non-invasive retractable/extendable storage system of claim 1, wherein each of said length adjustable vertical frame member further comprise a locking component to lock each of said length adjustable vertical frame member to a desired length.

5. The modular universal non-invasive retractable/extendable storage system of claim 1, wherein said storage component comprises a bottom, a front wall, back wall, a first side wall and a second side wall.

6. The modular universal non-invasive retractable/extendable storage system of claim 1, further comprising a storage component lock to lock said storage component in a desired location along said storage component track.

7. The modular universal non-invasive retractable/extendable storage system of claim 1, wherein said storage component track comprises a plurality of rollers for movement of said storage component along said component track.

8. The modular universal non-invasive retractable/extendable storage system of claim 7, wherein said plurality of rollers run a length of said component track.

9. The modular universal non-invasive retractable/extendable storage system of claim 7, wherein said plurality of rollers are situated at top and a bottom of said component track separated a distance apart for movably receiving the first side wall and the second side wall of said storage component.

10. The system of claim 1 wherein said storage component comprises a flat bottom panel and a handle portion integral with said flat bottom panel, wherein said flat bottom panel with said handle further comprises a rest bar extending along a length of a bottom of said flat bottom panel.

11. The system of claim 10, wherein said rest bar is height adjustable.

12. A modular universal non-invasive retractable/extendable storage system for a bed of a vehicle, such as a pick-up truck or trailer, or the like, said system comprising:
i) a storage component horizontally movable from a first to a second position; and
ii) a frame component fit onto the bed of said vehicle; said frame component for supporting said storage component;
said frame component further comprising at least one length adjustable transverse frame member and at least two spaced apart longitudinal frame members connected normal to said at least one length adjustable transverse frame member;
said at least one length adjustable transverse frame member further comprising a length adjustable vertical frame member at each end of said at least one length adjustable transverse frame member, each of said length adjustable vertical frame members further comprising a compression member at a top end thereof for compression fitting of said frame component onto the bed of a vehicle without piercing said bed of said vehicle;

each of said at least two spaced apart longitudinal frame members further comprising a storage component track, each storage component track for receiving a respective side of said storage component and for movement of said storage component in a horizontal plane from a first longitudinally retracted position to a second longitudinally extended position in relation to said bed of said vehicle.

13. The system of claim 12, wherein each of said length adjustable vertical frame member forms an angle in relation to said at least one length adjustable transverse member of from about 90 degrees to about 105 degrees from a center of said bed towards a side of said bed of said vehicle.

14. The system of claim 12, wherein said at least one length adjustable transverse frame member further comprises a locking component to lock said at least one length adjustable frame member to a desired length.

15. The system of claim 12, wherein each of said length adjustable vertical frame members further comprise a locking component to lock each of said length adjustable vertical frame members to a desired length.

16. The system of claim 12, wherein said storage component comprises a bottom, a front wall, back wall, a first side wall and a second side wall.

17. The system of claim 12, wherein said modular non-invasive system further comprises a storage component lock to lock said storage component in a desired location along said storage component track.

18. The system of claim 12, wherein said modular non-invasive system further comprises a secondary storage component lock to lock said storage component in a desired location along said storage component track.

19. The system of claim 12, wherein said modular non-invasive system further comprises a plurality of secondary storage component locks.

20. The system of claim 12, wherein each of said storage component tracks comprises a plurality of rollers for movement of said storage component along said storage component tracks.

21. The system of claim 20, wherein said plurality of rollers are situated at a top and a bottom of each of said storage component tracks.

22. The system of claim 12, wherein said compression member comprises a body with a bottom end and a top end.

23. The system of claim 22, wherein said body is wider at said top end than at said bottom end.

24. The system of claim 22, wherein said top end of said compression member further comprises a resilient portion running a length of said top end.

25. The system of claim 12, wherein said compression member is adjustable in position along said vertical adjustable frame member.

26. The system of claim 12, wherein said compression member is adjustable in position along said vertical adjustable frame member via a compression member position adjuster on said vertical adjustable frame member.

27. The system of claim 12, wherein said bottom end and a portion of said body of said compression member is slidably connected to said vertical length adjustable frame member.

28. The system of claim 27, wherein a portion of each side of said bottom end and said body of said compression member slidably engages with a compression member channel running along each side of said vertical length adjustable frame member.

29. The system of claim 12, wherein said compression member and said vertical length adjustable frame member further comprise a height locking mechanism to lock said compression member along said vertical length adjustable frame member to a desired position.

30. The system of claim 29, wherein said height locking mechanism comprises at least one vertically elongated slot on said compression member and at least one complementary set screw on said vertical length adjustable frame member in line with said at least one vertically elongated slot on said compression member allowing for locking the position of the compression member in relation to said vertical length adjustable frame member.

31. The system of claim 12, wherein each of said plurality of rollers comprise a first diameter roller portion and a second diameter roller portion, wherein said first diameter roller portion being greater than said second diameter roller portion forming a roller wall normal to a central axis of each of said plurality of rollers when transitioning from said first diameter roller portion to said second diameter roller portion, said roller wall reducing any unwanted lateral motion of said storage component during retraction and extension of said storage component along each of said storage component tracks without interfering with longitudinal motion of said storage component during retraction and extension of said storage component along each of said storage component tracks.

32. The system of claim 12, wherein, said modular universal non-invasive retractable/extendable storage system further comprises a second transverse frame member spaced apart from the at least one length adjustable transverse frame member; each end of said second transverse frame member being connected to an end of each of said storage component tracks.

33. The system of claim 32 further comprising a third transverse member.

* * * * *